(12) United States Patent
Arita et al.

(10) Patent No.: US 10,473,480 B2
(45) Date of Patent: *Nov. 12, 2019

(54) DISPLAY CONTROL DEVICE, AND DISPLAY DEVICE HAVING A VIRTUAL IMAGE DISPLAYED ON A WINDSHIELD, AND DISPLAY CONTROL METHOD THEREOF

(71) Applicant: Mitsubishi Electric Corporation, Tokyo (JP)

(72) Inventors: Hidekazu Arita, Tokyo (JP); Mitsuo Shimotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 15/576,042

(22) PCT Filed: Aug. 20, 2015

(86) PCT No.: PCT/JP2015/073379
§ 371 (c)(1),
(2) Date: Nov. 21, 2017

(87) PCT Pub. No.: WO2017/029759
PCT Pub. Date: Feb. 23, 2017

(65) Prior Publication Data
US 2018/0156627 A1    Jun. 7, 2018

(51) Int. Cl.
*G01C 21/36* (2006.01)
(52) U.S. Cl.
CPC ....... *G01C 21/365* (2013.01); *G01C 21/3632* (2013.01); *G01C 21/3679* (2013.01)
(58) Field of Classification Search
CPC .................................................. G01C 21/365
(Continued)

(56) References Cited

U.S. PATENT DOCUMENTS

2010/0164702 A1* 7/2010 Sasaki .................... G01B 21/22
340/438
2015/0260534 A1* 9/2015 Shen ...................... G01C 21/34
701/408

(Continued)

FOREIGN PATENT DOCUMENTS

JP           6-115381 A      4/1994
JP         2010-66042 A      3/2010

(Continued)

OTHER PUBLICATIONS

International Search Report issued in PCT/JP2015/073379 (PCT/ISA/210), dated Nov. 17, 2015.

*Primary Examiner* — Long D Pham
(74) *Attorney, Agent, or Firm* — Birch, Stewart, Kolasch & Birch, LLP

(57) ABSTRACT

A virtual image display 2 can display a display object being a virtual image which can be visually recognized from a driver's seat of a vehicle through a windshield in a virtual image position defined by a virtual image direction which is a direction of the virtual image on a basis of a specific position of the vehicle and a virtual image distance which is a distance to the virtual image on a basis of the specific position. A display control device 1 includes a relative position acquisition part 11 obtaining a relative position of an information-to-be-provided object which is a point or a feature associated with information with which a driver of the vehicle is provided, using the display object, and the vehicle and a controller 13 controlling a display of the virtual image display 2. The controller 13 changes a virtual image distance of the display object in accordance with the relative position of the information-to-be-provided object corresponding to the display object and the vehicle.

13 Claims, 21 Drawing Sheets

(58) Field of Classification Search
USPC .............................................................. 345/7
See application file for complete search history.

(56) References Cited

U.S. PATENT DOCUMENTS

2016/0167514 A1* 6/2016 Nishizaki ............... G09G 3/025
                                                                                        345/7
2016/0170487 A1* 6/2016 Saisho ............... G01C 21/3635
                                                                                       345/156

FOREIGN PATENT DOCUMENTS

| JP | 2010-173619 A | 8/2010 |
| JP | 2011-203053 A | 10/2011 |
| JP | 2015-31700 A | 2/2015 |

\* cited by examiner

F I G . 3 8
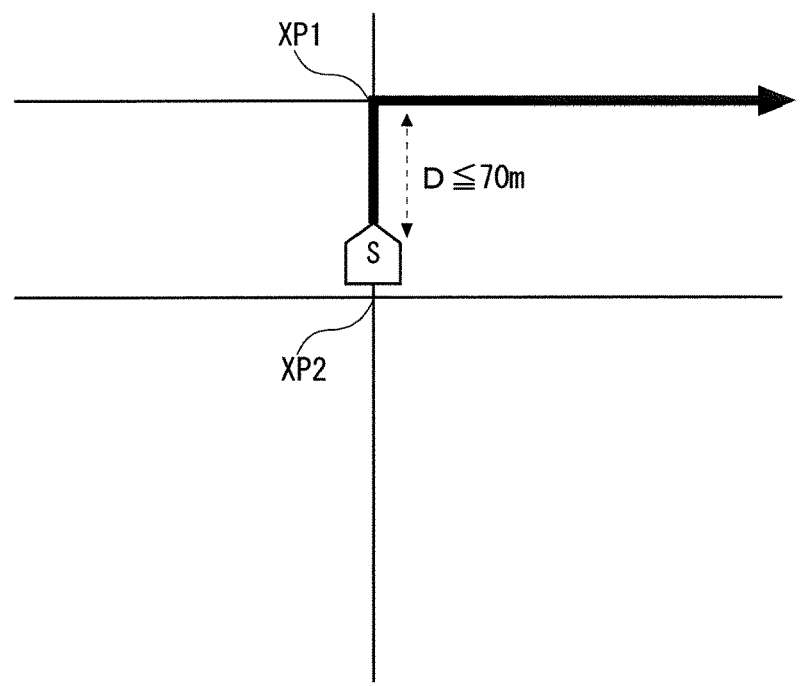
F I G . 3 9
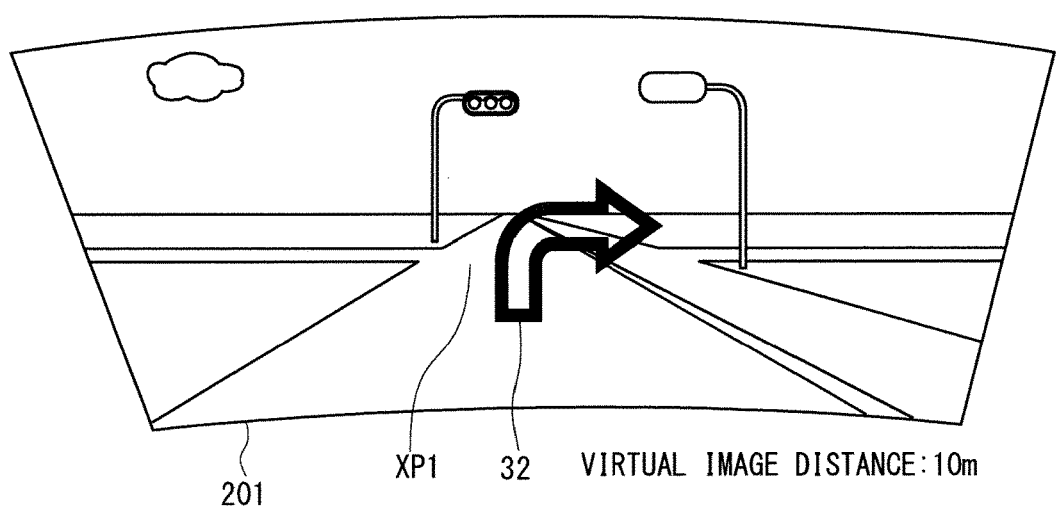

F I G . 4 4
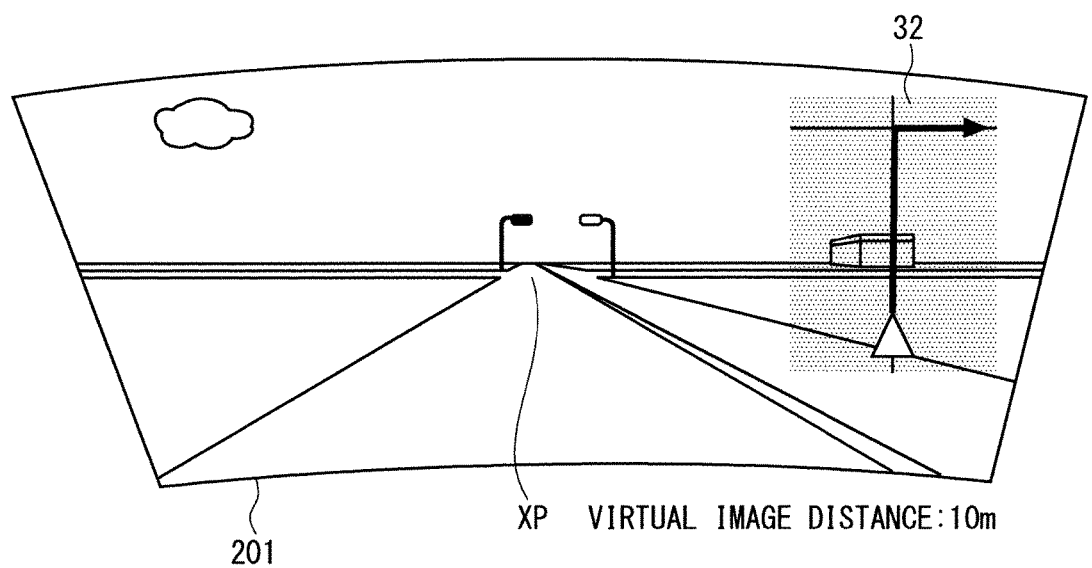

US 10,473,480 B2

DISPLAY CONTROL DEVICE, AND DISPLAY DEVICE HAVING A VIRTUAL IMAGE DISPLAYED ON A WINDSHIELD, AND DISPLAY CONTROL METHOD THEREOF

TECHNICAL FIELD

The present invention relates to a display control device for controlling a virtual image display and a display control method using the virtual image display.

BACKGROUND ART

Various techniques are proposed with regard to a head-up display (HUD) for displaying an image on a windshield of a vehicle. For example, proposed is a HUD for displaying an image as a virtual image as if it really existed in a real landscape in front of the vehicle seen from a driver. For example, Patent Document 1 proposes a HUD which changes a distance between an apparent position of a virtual image and a driver in accordance with a vehicle speed.

PRIOR ART DOCUMENTS

Patent Documents

Patent Document 1: Japanese Patent Application Laid-Open No. 6-115381

SUMMARY

Problem to be Solved by the Invention

Although the conventional technique described above can directly display various information as a virtual image in a visual field of the driver, a technique which can provide the driver with the information more effectively is desired.

The present invention has been achieved to solve problems as described above, and it is an object of the present invention to provide a technique capable of effectively providing a driver with information using a virtual image display which can change an apparent position of a virtual image.

Means to Solve the Problem

A display control device according to the present invention is a display control device for controlling a virtual image display, wherein the virtual image display can display a display object being a virtual image which can be visually recognized from a driver's seat of a vehicle through a windshield of the vehicle in a virtual image position defined by a virtual image direction which is a direction of the virtual image on a basis of a specific position of the vehicle and a virtual image distance which is a distance to the virtual image on a basis of the specific position, and the display control device includes a relative position acquisition part to obtain a relative position of an information-to-be-provided object which is a point or a feature associated with information with which a driver of the vehicle is provided, using the display object, and the vehicle and a controller to control a display of the virtual image display, and the controller changes a virtual image distance of the display object in accordance with the relative position of the information-to-be-provided object corresponding to the display object and the vehicle.

Effects of the Invention

According to the present invention, the virtual image distance of the display object changes in accordance with the relative position of the vehicle and the information-to-be-provided object, thus the driver can be effectively provided with the information.

These and other objects, features, aspects and advantages of the present invention will become more apparent from the following detailed description of the present invention when taken in conjunction with the accompanying drawings.

BRIEF DESCRIPTION OF DRAWINGS

FIG. 38 A drawing illustrating an example of a positional relationship between the own vehicle and the guidance point.

FIG. 39 A drawing illustrating a display example of the guide display object.

FIG. 44 A drawing illustrating a display example of the guide display object.

DESCRIPTION OF EMBODIMENT(S)

Embodiment 1

Figure 1:
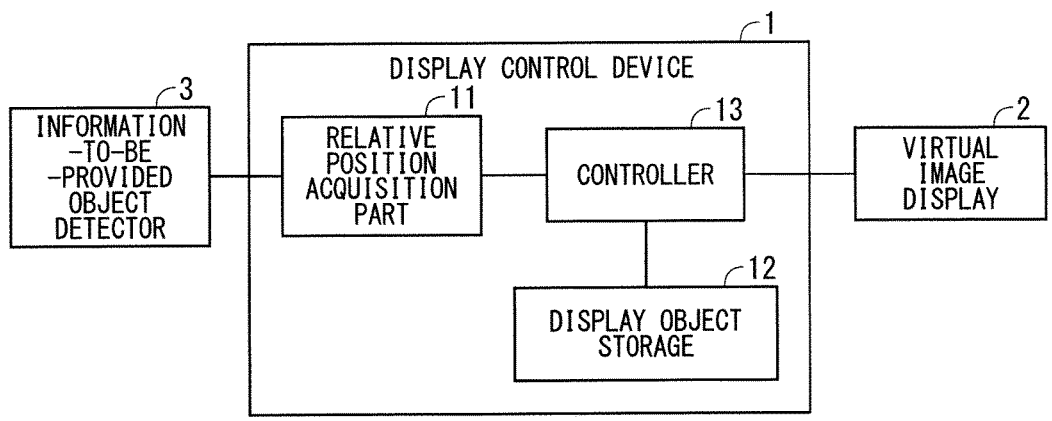
FIG. 1 A block diagram illustrating a configuration of a display control device according to an embodiment 1.

FIG. 1 is a drawing illustrating a configuration of a display control device 1 according to the embodiment 1 of the present invention. In a description of the present embodiment, the display control device 1 is mounted on a vehicle. The vehicle on which the display control device 1 is mounted is referred to as "the own vehicle".

The display control device 1 controls a virtual image display 2 displaying an image as a virtual image in a visual field of a driver such as a HUD, for example. An information-to-be-provided object detector 3 for detecting an information-to-be-provided object, which is a point or feature associated with information with which the driver of the own vehicle is provided, is connected to the display control device 1. Herein, an example of externally connecting the virtual image display 2 to the display control device 1 is described, however, the virtual image display 2 may be formed to be integral with the display control device 1. That is to say, the display control device 1 and the virtual image display 2 may be formed as one display device.

Figure 2:
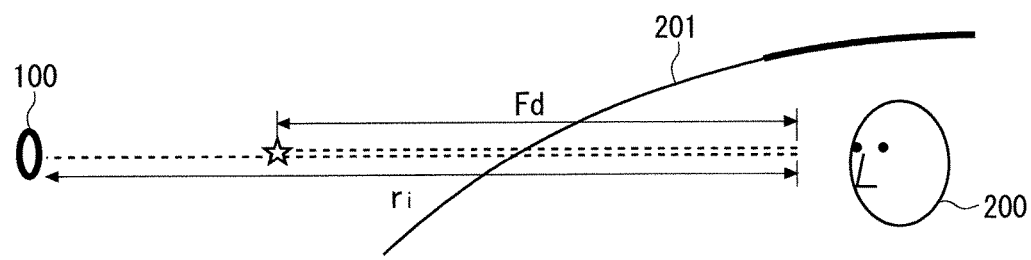
FIG. 2 A drawing for describing a virtual image (a display object) displayed by a virtual image display.

The virtual image displayed by the virtual image display 2 is described with reference to FIG. 2 and FIG. 3. In the present description, the virtual image displayed by the virtual image display 2 is referred to "the display object". The virtual image display 2 can display the display object 100 in a position which can be visually recognized from a position of a driver 200 in the own vehicle through a windshield 201 as illustrated in FIG. 2. The position in which the display object 100 is actually displayed is located on the windshield 201, however, the display object 100 is seen from the driver 200 as if it really existed in a landscape in front of the vehicle.

In the present description, the apparent display position of the display object 100 seen from the driver 200 is referred to as "the virtual image position". The virtual image position is defined by "a virtual image direction" which is a direction of the display object 100 based on the position of the driver 200 and "a virtual image distance" which is an apparent distance from the position of the driver 200 to the display object 100. As described above, a reference point for defining the virtual image position is preferably the position of the driver 200, however, a specific position in the vehicle which can be considered as the position of the driver 200 may also be applied to the reference point, so that a specific point in a driver's seat or windshield 201 or a position corresponding to an area near eyes of the driver may also be applied to the reference point, for example. A point in a space in the vehicle corresponding to a central point of both eyes of the driver assumed for designing a mounting position of the HUD may also be applied to the reference point.

Figure 3:
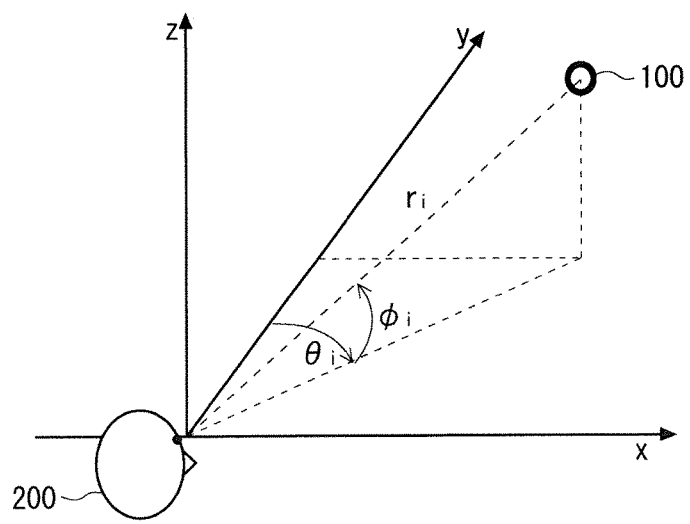
FIG. 3 A drawing for describing the display object displayed by the virtual image display.

The virtual image direction substantially corresponds to the position of the display object 100 on the windshield 201 seen from the driver 200, and is expressed by a variation angle $(\theta_i, \varphi_i)$ of a three-dimensional polar coordinate system as illustrated in FIG. 3, for example. The virtual image distance substantially corresponds to an apparent distance from the driver 200 to the display object 100, and is expressed as a moving radius $(r_i)$ of the three-dimensional polar coordinate system as illustrated in FIG. 3, for example. The driver 200 can visually recognize the display object 100 in the virtual image position expressed by the three-dimensional polar coordinate system $(r_i, \theta_i, \varphi_i)$ by adjusting a distance Fd of a focus of his/her eyes to the virtual image distance $(r_i)$.

Figure 4:
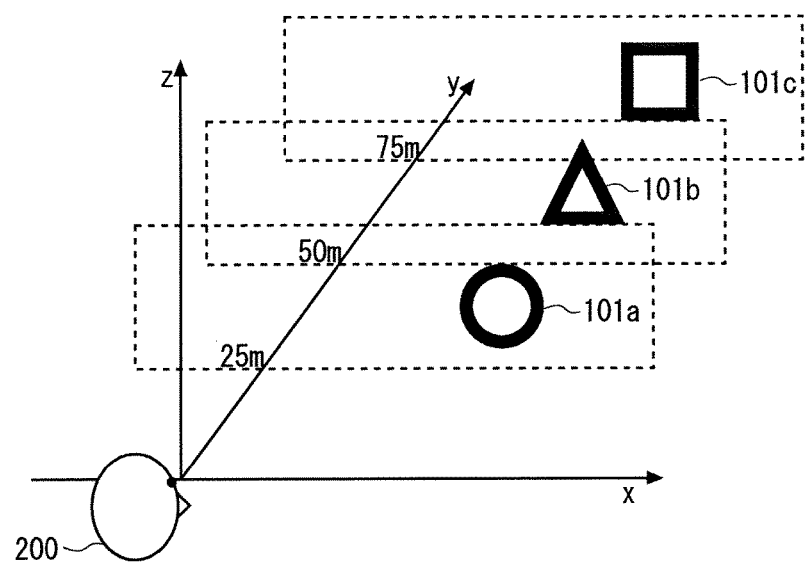
FIG. 4 A drawing for describing the display object displayed by the virtual image display.

When the virtual image position is expressed by the three-dimensional polar coordinate system, a surface in which the virtual image distance $(r_i)$ is equal forms into a spherical surface, however, when the virtual image direction is limited to a certain range (the front side of the vehicle) as in the case of the virtual image display 2 for the vehicle, it is also applicable to cause the surface in which the virtual image distance is equal to be approximate to a planar surface. An optical correction is generally performed in the HUD to cause a display surface of the virtual image to have a planar shape. In a description described hereinafter, the surface in which the virtual image distance is equal is treated as a planar surface as illustrated in FIG. 4 (a travel direction of the vehicle is defined as a y axis, and a planar surface of $y=r_i$ is defined as a display surface of the virtual image distance $r_i$ in FIG. 4).

Next, the information-to-be-provided object detected by the information-to-be-provided object detector 3 is described. The information-to-be-provided object detector 3 detects the information-to-be-provided object located around a road along which the own vehicle is moving. Examples of a feature to be the information-to-be-provided object include a building and a facility to be so-called landmarks, and examples of a point to be the information-to-be-provided object include an intersection and a high-accident location, for example. These positions can be detected based on a map information including a positional information of each point and feature and a positional information of the own vehicle. Herein, the information-to-be-provided object detector 3 includes a storage device for storing the map information and a detection device for detecting the positional information of the own vehicle, however, the information-to-be-provided object detector 3 may obtain the information from a navigation device of the own vehicle, for example.

A user may optionally specify which feature or point is set as the information-to-be-provided object. For example, the user may specify the information-to-be-provided object by a category such as "a convenience store", "a gas station", or "a restaurant", or also may specify it by a more specific name.

Going back to FIG. 1, the display control device 1 includes a relative position acquisition part 11, a display object storage 12, and a controller 13.

The relative position acquisition part 11 obtains a relative position of the information-to-be-provided object detected by the information-to-be-provided object detector 3 and the own vehicle. The relative position of the information-to-be-provided object and the own vehicle can be calculated from the positional information of the information-to-be-provided object included in the map information and the positional information of the own vehicle. The present embodiment has a configuration that the information-to-be-provided object detector 3 calculates the relative position of the information-to-be-provided object, and the relative position acquisition part 11 obtains the calculation result. Alternatively, the relative position acquisition part 11 may calculate the relative position of the information-to-be-provided object from the information obtained from the information-to-be-provided object detector 3.

The display object storage 12 stores an image data of a plurality of display objects in advance. The display object stored in the display object storage 12 includes an image for indicating the position of the information-to-be-provided object (for example, an arrow or a balloon figure).

The controller 13 collectively controls each constituent element of the display control device 1 and also controls the display of the virtual image displayed by the virtual image display 2. For example, the controller 13 can display the display object stored in the display object storage 12 in the visual field of the driver 200 using the virtual image display 2. The controller 13 can control the virtual image position (the virtual image direction and the virtual image distance) of the display object displayed by the virtual image display 2. A typical display object is stored in the display object storage 12, however, the controller 13 may deform the typical display object or generate an atypical display object.

For example, the virtual image display 2 is assumed to be able to set the virtual image distance of the display object, selecting from 25 m, 50 m, and 75 m. In the above case, the controller 13 can cause the virtual image display 2 to display a first display object 101*a* whose virtual image distance is 25 m, a second display object 101*b* whose virtual image distance is 50 m, and a third display object 101*c* whose virtual image distance is 75 m as illustrated in FIG. 4. In the above case, the drivers sees these display objects through the windshield 201 as if the first display object 101*a* is located 25 m ahead, the second display object 101*b* is located 50 m ahead, and the third display object 101*c* is located 75 m ahead as illustrated in FIG. 5 (an element of a sign 202 is a handle of the own vehicle).

Figure 5:
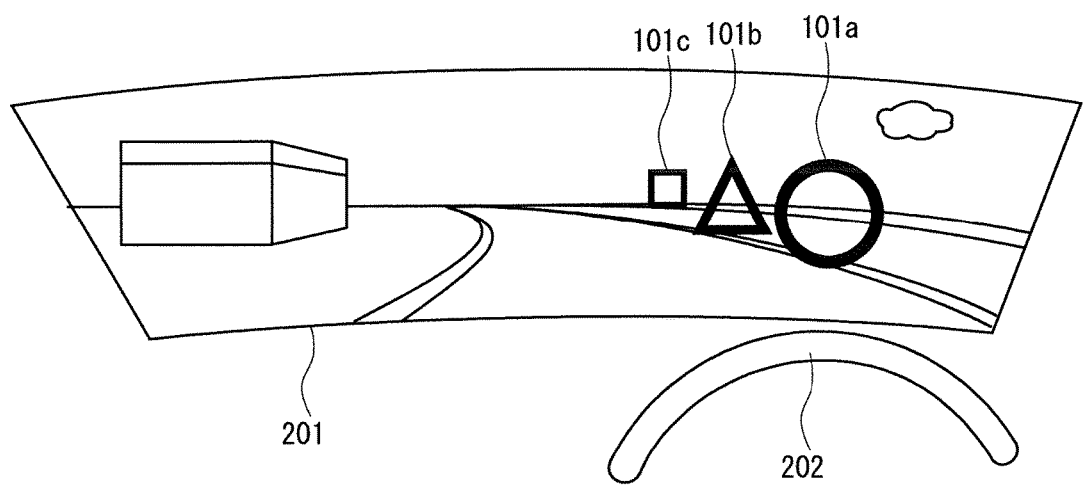
FIG. 5 A drawing for describing the display object displayed by the virtual image display.

Although FIG. 5 illustrates an example that a plurality of display objects whose virtual image distances are different from each other are simultaneously displayed, the virtual image display 2 may have a configuration that only one virtual image distance can be set for the plurality of display objects which are simultaneously displayed (all of the display distances of the display objects which are simultaneously displayed are the same) when the virtual image distance of the display object can be changed.

Figure 6:
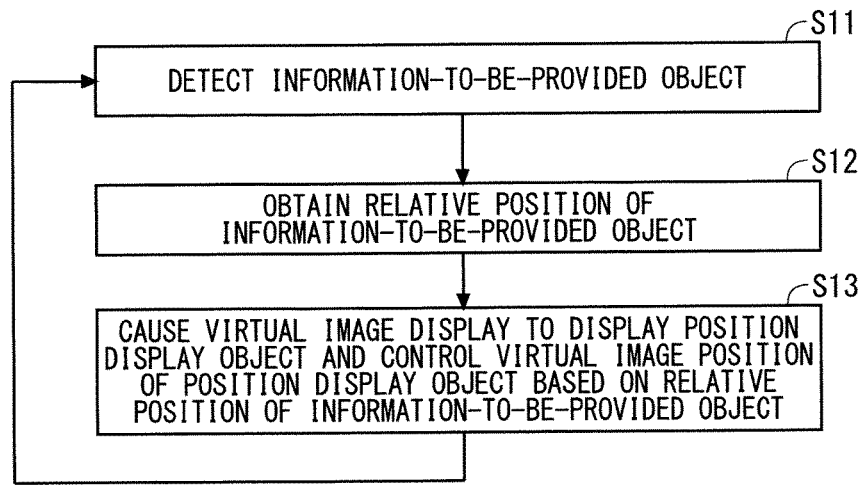
FIG. 6 A flow chart illustrating an operation of a display control device according to the embodiment 1.

Next, an operation of the display control device 1 according to the embodiment 1 is described. FIG. 6 is a flow chart illustrating the operation. In the embodiment 1, when the information-to-be-provided object is detected, the display control device 1 operates to provide the driver, using the display object, the position of the information-to-be-provided object as the information associated with the detected information-to-be-provided object with its name. The display object indicating the position of the information-to-be-provided object is referred to as "the position display object" hereinafter.

For example, when the information-to-be-provided object detector 3 detects the information-to-be-provided object while the own vehicle is moving (Step S11), the relative position acquisition part 11 of the display control device 1 obtains the relative position of the detected information-to-be-provided object and the own vehicle (Step S12).

When the relative position acquisition part 11 obtains the relative position of the information-to-be-provided object, the controller 13 obtains the data of the position display object (for example, the arrow or the balloon figure) of the information-to-be-provided object from the display object storage 12, and causes the virtual image display 2 to display it, thereby providing the driver with the position of the information-to-be-provided object (Step S13). In Step S13, the controller 13 controls the virtual image position (the virtual image direction and the virtual image distance) of the position display object based on the relative position of the information-to-be-provided object and the own vehicle. The display control device 1 performs the operation of these Steps S11 to S13 repeatedly.

The virtual image position control of the position display object performed in Step S13 is described hereinafter. The controller 13 sets the virtual image direction of the position display object so that the position display object indicates the position of the information-to-be-provided object when seen from the driver. That is to say, the virtual image direction is set so that the position display object is displayed in the direction which the information-to-be-provided object is seen from the driver or in its neighborhood.

The controller 13 changes the virtual image distance of the position display object based on the relative position of the own vehicle and the information-to-be-provided object. Specifically, when the own vehicle enters a predetermined area on a basis of the information-to-be-provided object, the virtual image distance of the position display object is made smaller than that before the own vehicle enters the area.

In the present embodiment, the virtual image display 2 is assumed to be able to set the virtual image distance of the display object, selecting from 10 m and 50 m. "The predetermined area" described above indicates an area located within 50 m from the information-to-be-provided object. These numeral values are only examples, so that another value may also be used. Moreover, "the predetermined area" needs not be defined as a certain distance, but may be changed depending on a speed of the own vehicle such as "a distance which the own vehicle can move in 20 seconds", for example.

Figure 7:
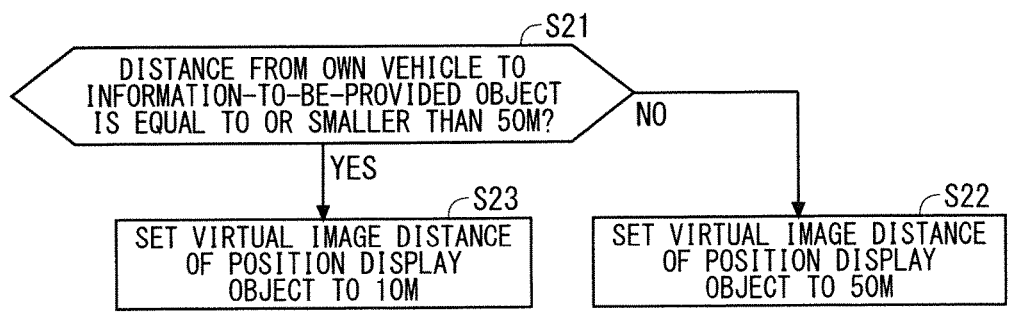
FIG. 7 A flow chart of a virtual image distance control in the embodiment 1.

FIG. 7 is a flow chart of the virtual image distance control of the position display object in the display control device 1. Firstly, the controller 13 confirms whether the distance from the own vehicle to the information-to-be-provided object is equal to or smaller than 50 m based on the relative position of the own vehicle and the information-to-be-provided object obtained by the relative position acquisition part 11 (Step S21). At this time, when the distance from the own vehicle to the information-to-be-provided object is equal to or larger than 50 m (NO in Step S21), the controller 13 sets the virtual image distance of the position display object to 50 m (Step S22). When the distance from the own vehicle to the information-to-be-provided object is equal to or smaller than 50 m (YES in Step S21), the controller 13 sets the virtual image distance of the position display object to 10 m (Step S23).

Figure 8:
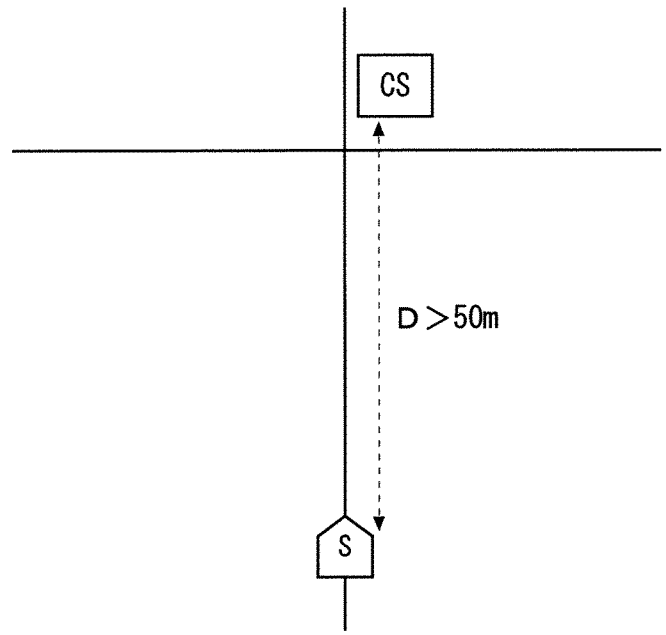
FIG. 8 A drawing illustrating an example of a positional relationship between an own vehicle and an information-to-be-provided object.
Figure 9:
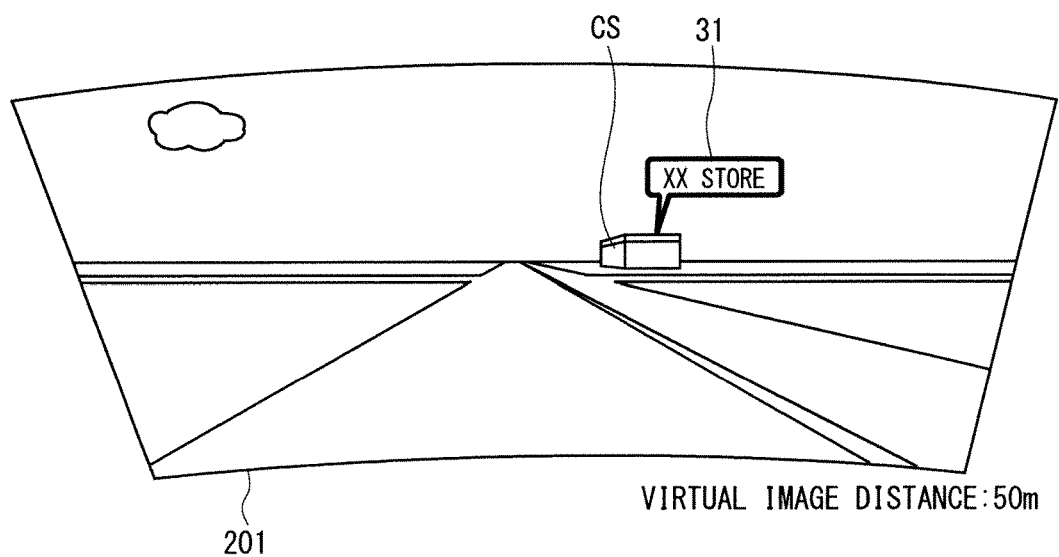
FIG. 9 A drawing illustrating a display example of a position display object.

For example, a convenience store CS (a name is "XX store") located in front of an own vehicle S as illustrated in FIG. 8 is determined to be the information-to-be-provided object. When a distance D from the own vehicle S to the convenience store CS is larger than 50 m as illustrated in FIG. 8, the position display object 31 indicating the position and the name of the convenience store CS is displayed in the virtual image distance 50 m as illustrated in FIG. 9.

Figure 10:
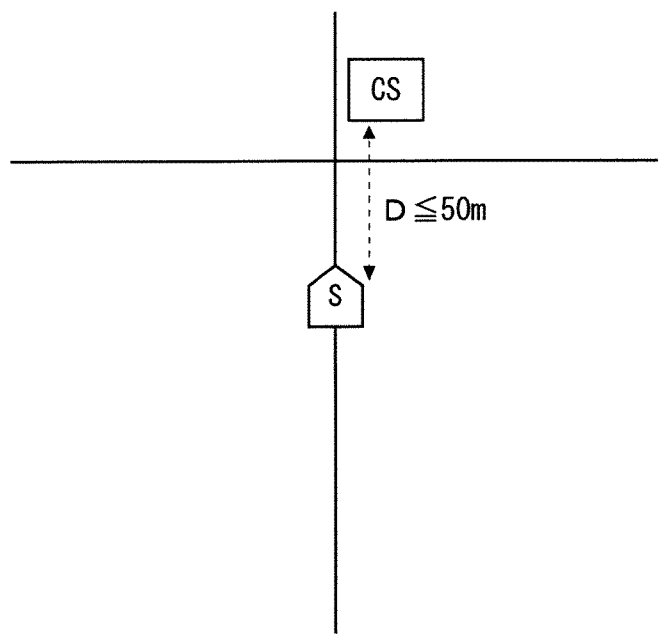
FIG. 10 A drawing illustrating an example of a positional relationship between the own vehicle and the information-to-be-provided object.
Figure 11:
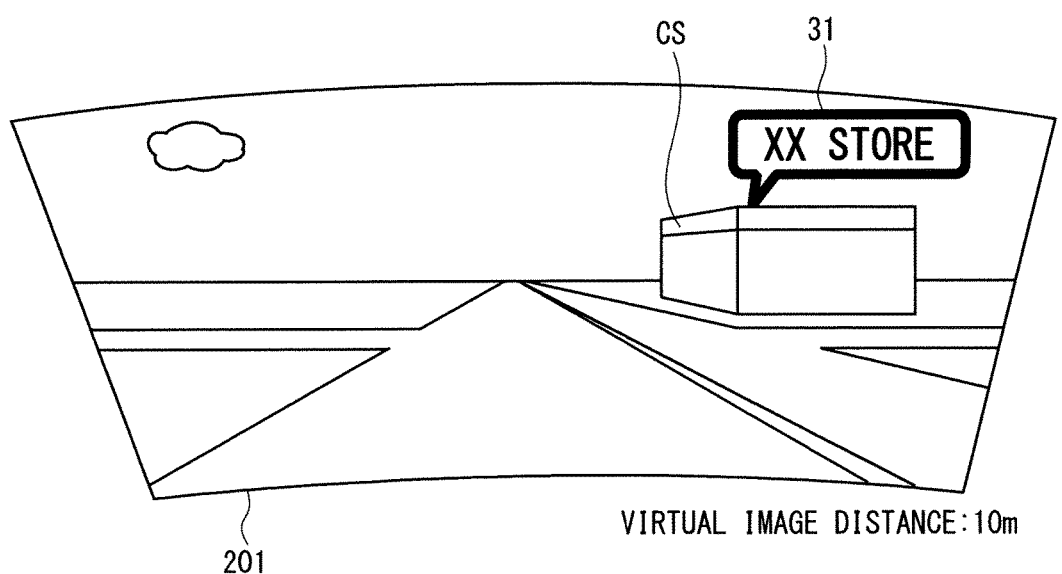
FIG. 11 A drawing illustrating a display example of the position display object.

Subsequently, when the own vehicle S moves forward and the distance D from the own vehicle S to the convenience store CS is reduced to be equal to or smaller than 50 m as illustrated in FIG. 10, the virtual image distance of the position display object 31 is changed to 10 m as illustrated in FIG. 11. Accordingly, the driver of the own vehicle S can easily recognize that he/she has gotten closer to the convenience store CS.

Although the virtual image display 2 can set the virtual image distance to the two steps of 10 m and 50 m herein, it is also applicable that the virtual image display 2 can change the virtual image distance in multi-steps of three or more steps or in a continuous manner. In the above case, the virtual image distance of the position display object 31 may be reduced in a step-by-step manner or a continuous manner as the own vehicle S gets closer to the convenience store CS even after the distance D from the own vehicle S to the convenience store CS is reduced to be equal to or smaller than 50 m (even after the virtual image distance is reduced to 10 m).

As described above, according to the present embodiment, the virtual image distance of the display object (the position display object) changes in accordance with the relative position of the own vehicle and the information-to-be-provided object, thus the driver can be effectively provided with the information.

Figure 12:
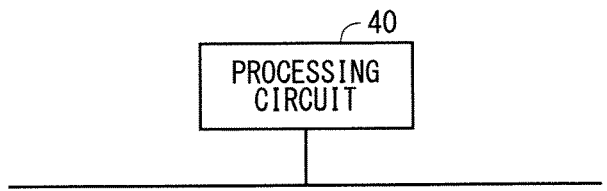
FIG. 12 A drawing illustrating an example of a hardware configuration of the display control device according to the embodiment 1.
Figure 13:
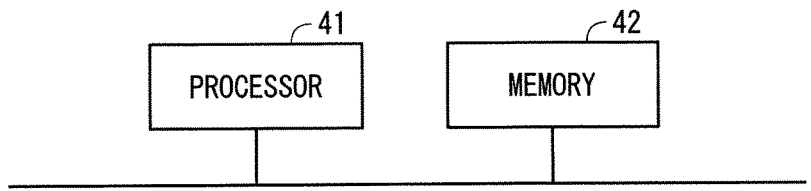
FIG. 13 A drawing illustrating an example of a hardware configuration of the display control device according to the embodiment 1.

FIG. 12 and FIG. 13 are drawings each illustrating an example of a hardware configuration of the display control device 1. The relative position acquisition part 11 and the controller 13 in the display control device 1 are achieved by a processing circuit 40 illustrated in FIG. 12, for example. That is to say, the processing circuit 40 includes the relative position acquisition part 11 which obtains the relative position of the information-to-be-provided object and the own vehicle and the controller 13 which changes the virtual image distance of the display object in accordance with the relative position of the information-to-be-provided object and the own vehicle corresponding to the display object. A dedicated hardware may be applied to the processing circuit 40, or a processor for executing a program stored in a memory (a Central Processing Unit, a processing apparatus, an arithmetic device, a microprocessor, a microcomputer, a Digital Signal Processor) may also be applied to the processing circuit 40.

When the processing circuit 40 is the dedicated hardware, a single circuit, a complex circuit, a programmed processor, a parallel-programmed processor, an ASIC, a FPGA, or a combination of them, for example, falls under the processing circuit 40. Each function of the relative position acquisition part 11 and the controller 13 may be achieved by the plurality of processing circuits 40, or each function of them may also be collectively achieved by one processing circuit 40.

FIG. 13 illustrates a hardware configuration of the display control device 1 in a case where the processing circuit 40 is the processor. In the above case, the functions of the relative position acquisition part 11 and the controller 13 are achieved by a combination with a software (a software, a firmware, or a software and a firmware), for example. The software, for example, is described as a program and is stored in a memory 42. A processor 41 as the processing circuit 40 reads out and executes a program stored in the memory 42, thereby achieving the function of each part. That is to say, the display control device 1 includes the memory 42 to store the program to resultingly execute, at a time of being executed by the processing circuit 40a, a step of obtaining the relative position of the information-to-be-provided object and the own vehicle and a step of changing the virtual image distance of the display object in accordance with the relative position of the information-to-be-provided object corresponding to the display object and the own vehicle. In other words, this program is also deemed to cause a computer to execute a procedure or a method of the relative position acquisition part 11 and the controller 13. Herein, a non-volatile or volatile semiconductor memory such as a RAM (Random Access Memory), a ROM (Read Only Memory), a flash memory, an EPROM (Erasable Programmable Read Only Memory), or an EEPROM (Electrically Erasable Programmable Read Only Memory), an HDD (Hard Disk Drive), a magnetic disc, a flexible disc, an optical disc, a compact disc, a mini disc, a DVD (Digital Versatile Disc), or a drive device of them, for example, falls under the memory 42.

Described above is the configuration that each function of the relative position acquisition part 11 and the controller 13 is achieved by one of the hardware and the software, for example. However, the configuration is not limited thereto, but also applicable is a configuration of achieving a part of the relative position acquisition part 11 and the controller 13 by a dedicated hardware and achieving another part of them by a software, for example. For example, the function of the controller 13 can be achieved by a processing circuit as the dedicated hardware, and the function of another part can be achieved by the processing circuit 40 as the processor 41 reading out and executing the program stored in the memory 42.

As described above, the processing circuit 40 can achieve each function described above by the hardware, the software, or the combination of them, for example. The display object storage 12 is made up of the memory 42.

The display control device described above can be applied to a Portable Navigation Device which can be mounted on the vehicle, a communication terminal (a portable terminal such as a mobile phone, a smartphone, or a tablet, for example), a function of an application installed on them, and a display control system constructed as a system by appropriately combining a server, for example. In the above case, each function or each constituent element of the display control device described above may be dispersedly disposed in each apparatus constructing the system described above, or may also be collectively disposed in one of the apparatuses.

Embodiment 2

For example, there may be a plurality of facilities such as a convenience store and a gas station in a narrow area in some cases. When positions of such facilities are displayed by the position display objects, it is difficult to recognize which facility is indicated by the position display object. The embodiment 2 describes a technique to solve the problem.

In the embodiment 2, the information-to-be-provided object detector 3 is configured to detect not only the information-to-be-provided object but also a point or a feature which is a type identical with or similar to the information-to-be-provided object (referred to "the similar feature" hereinafter). The relative position acquisition part 11 of the display control device 1 is also configured to obtain the relative position of the similar feature detected by the information-to-be-provided object detector 3 and the own vehicle.

Figure 14:
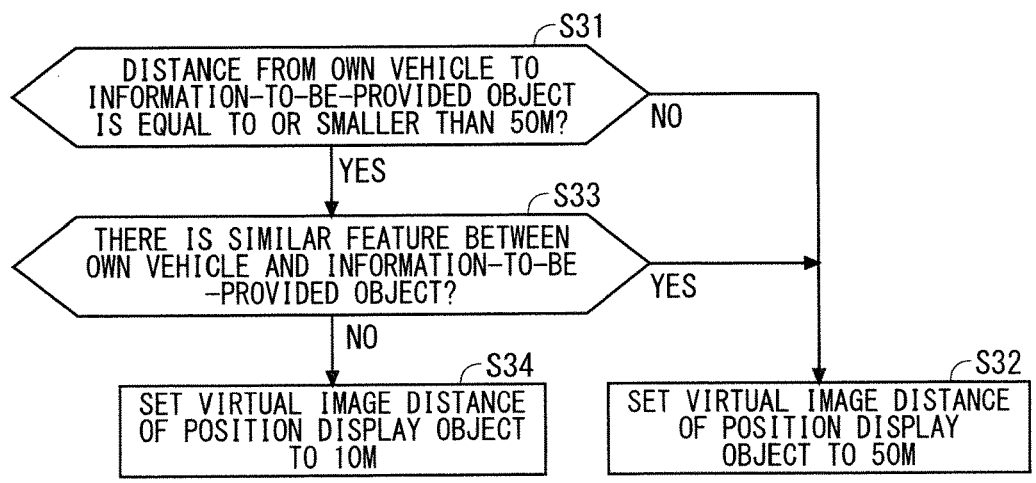
FIG. 14 A flow chart of a virtual image distance control according to an embodiment 2.

FIG. 14 is a flow chart of a virtual image distance control in the embodiment 2. Firstly, the controller 13 confirms whether the distance from the own vehicle to the information-to-be-provided object is equal to or smaller than 50 m based on the relative position of the own vehicle and the information-to-be-provided object obtained by the relative position acquisition part 11 (Step S31). At this time, when the distance from the own vehicle to the information-to-be-provided object is larger than 50 m (NO in Step S31), the controller 13 sets the virtual image distance of the position display object to 50 m (Step S32).

When the distance from the own vehicle to the information-to-be-provided object is equal to or smaller than 50 m (YES in Step S31), the controller 13 further confirms whether or not there is a similar feature between the own vehicle and the information-to-be-provided object based on the relative position of the own vehicle and the similar feature (Step S33). When there is the similar feature between the own vehicle and the information-to-be-provided object (YES in Step S33), the controller 13 sets the virtual image distance of the position display object to 50 m (Step S32). When there is no similar feature between the own vehicle and the information-to-be-provided object (NO in Step S33), the controller 13 sets the virtual image distance of the position display object to 10 m (Step S34).

As described above, in the embodiment 2, in case where there is the point or the feature which is the type identical with or similar to the information-to-be-provided object (the similar feature) between the own vehicle and the information-to-be-provided object, the virtual image distance of the position display object is not reduced even when the own vehicle enters the area within 50 m of the information-to-be-provided object (the virtual image distance is maintained 50 m).

Figure 15:
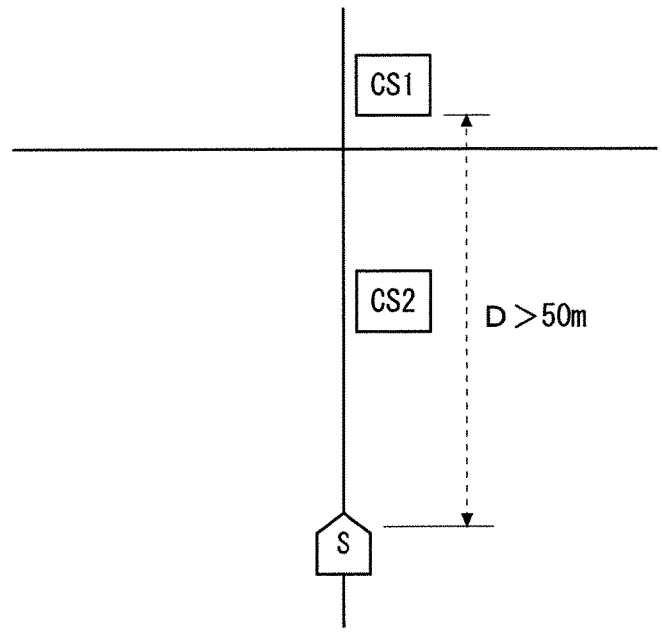
FIG. 15 A drawing illustrating an example of a positional relationship between the own vehicle and the information-to-be-provided object.
Figure 16:
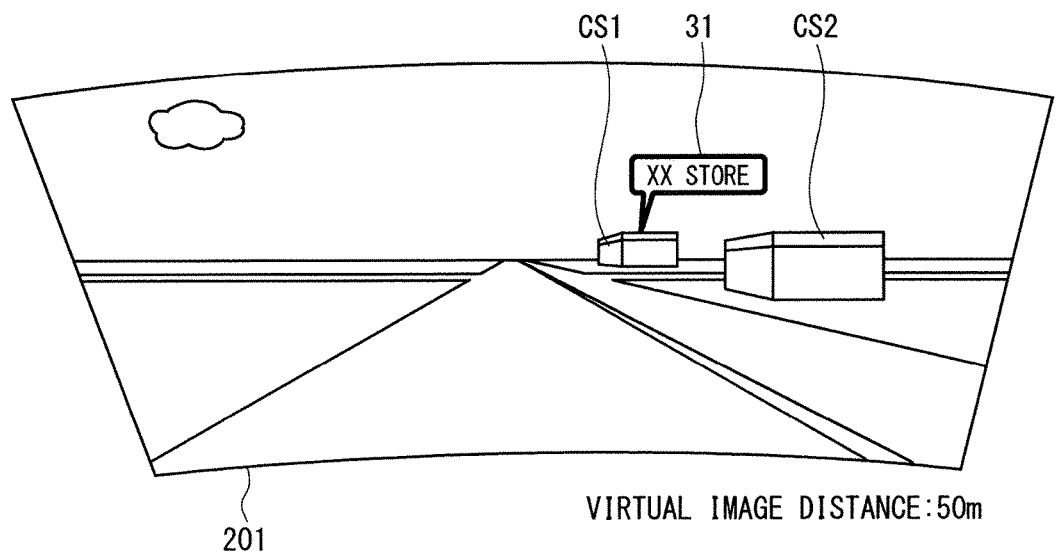
FIG. 16 A drawing illustrating a display example of a position display object.

For example, a convenience store CS1 (a name is "XX store") located in front of the own vehicle S as illustrated in FIG. 15 is determined to be the information-to-be-provided object. Considered is a case where a convenience store CS2 which is a similar feature is located on a near side of the convenience store CS1. When the distance D between the own vehicle S and the convenience store CS1 is larger than 50 m as illustrated in FIG. 15, the position display object 31 of the convenience store CS1 is displayed in the virtual image distance 50 m as illustrated in FIG. 16 in accordance with a principle.

Figure 17:
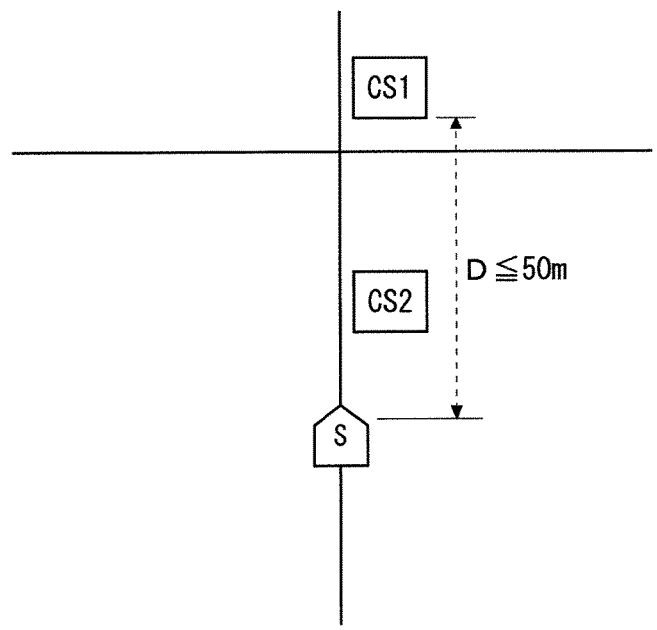
FIG. 17 A drawing illustrating an example of a positional relationship between the own vehicle and the information-to-be-provided object.
Figure 18:
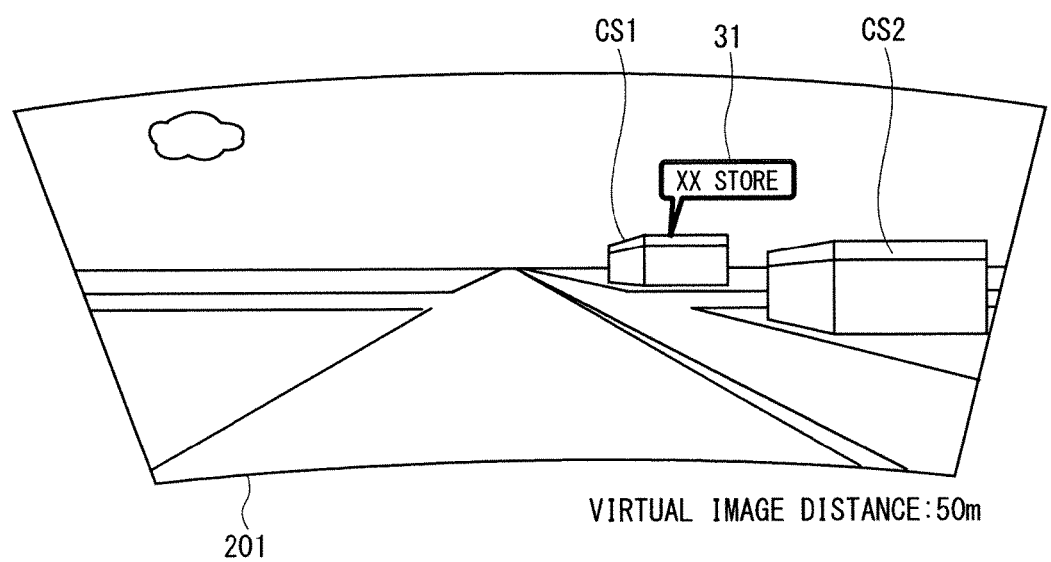
FIG. 18 A drawing illustrating a display example of the position display object.

Subsequently, when the own vehicle S moves forward, the distance D from the own vehicle S to the convenience store CS1 is reduced to be equal to or smaller than 50 m as illustrated in FIG. 17, however, when there is the convenience store CS2 which is the similar feature between the convenience store CS1 and the own vehicle S, the virtual image distance of the position display object 31 of the convenience store CS1 is exceptionally maintained 50 m as illustrated in FIG. 18.

Figure 19:
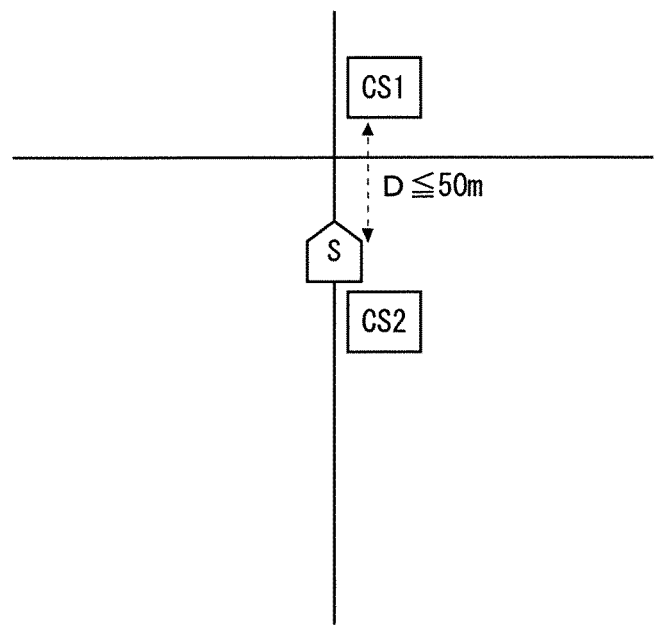
FIG. 19 A drawing illustrating an example of a positional relationship between the own vehicle and the information-to-be-provided object.
Figure 20:
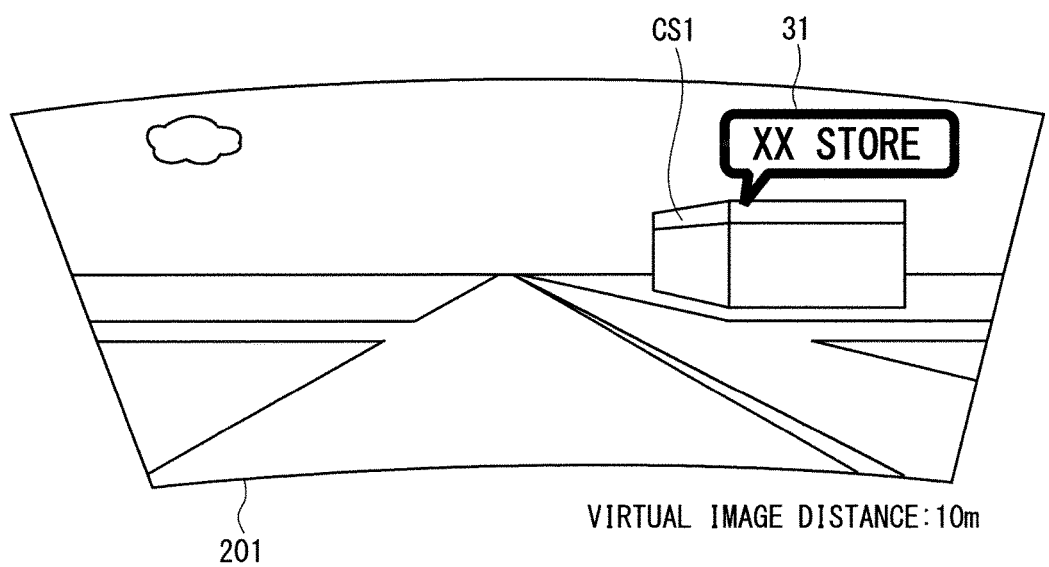
FIG. 20 A drawing illustrating a display example of the position display object.

When the own vehicle S further moves forward and passes in front of the convenience store CS2, the similar feature ceases to exist between the own vehicle S and the convenience store CS1 as illustrated in FIG. 19. Then, as illustrated in FIG. 20, the virtual image distance of the position display object 31 of the convenience store CS1 is changed to 10 m. Accordingly, the driver of the own vehicle S can easily recognize that the position display object 31 indicates not the convenience store CS2 but the convenience store CS1.

Embodiment 3

Figure 21:
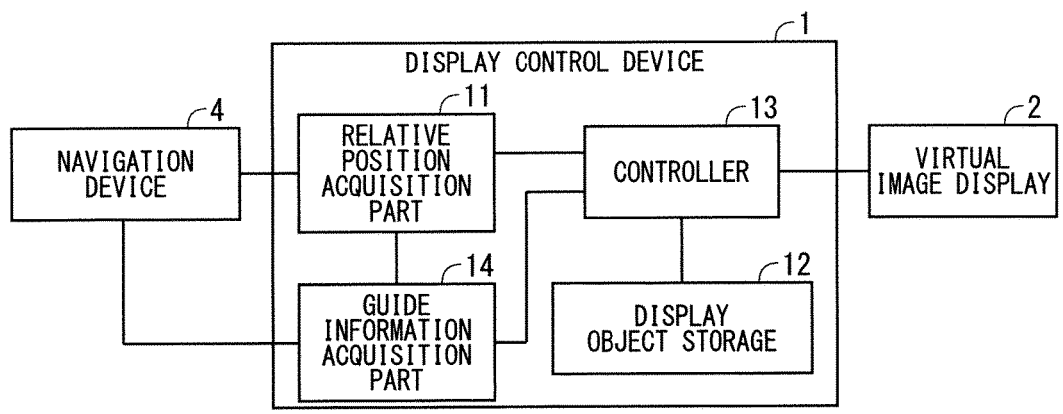
FIG. 21 A block diagram illustrating a configuration of a display control device according to an embodiment 3.

FIG. 21 is a block diagram illustrating a configuration of the display control device 1 according to the embodiment 3. A navigation device 4 of the own vehicle instead of the information-to-be-provided object detector 3 is connected to the display control device 1 according to the embodiment 3. The display control device 1 has a configuration that a guide information acquisition part 14 for obtaining the information of a route guidance of the own vehicle from the navigation device 4 is added to the configuration of FIG. 1.

The display control device 1 according to the embodiment 3 controls the virtual image display 2, thereby causing the virtual image display 2 to display contents of the route guidance which the guide information acquisition part 14 obtains from the navigation device 4 in the visual field of the driver as the display object. The display object indicating the contents of the route guidance is referred to as "the guide display object" hereinafter.

Figure 22:
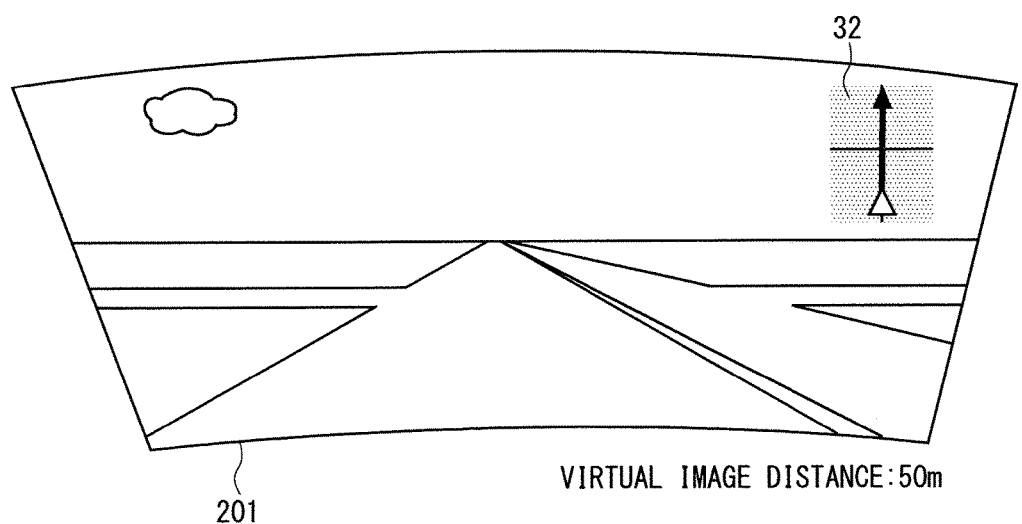
FIG. 22 A drawing illustrating a display example of a guide display object.

An operation of the display control device 1 according to the embodiment 3 is described. Herein, the guide display object 32 displayed by the virtual image display 2 is an image of a map around the own vehicle including a display of a scheduled traveling route of the own vehicle as illustrated in FIG. 22. The information-to-be-provided object in the present embodiment is a point of which the navigation device 4 performs a route guidance to the driver (a guidance point). The guidance point is mainly a point where the own vehicle needs to change its travel direction, that is, for example, a fork in a road (an intersection, for example), a junction (an entrance and exit of express highway, for example), or a point of changing lane.

Figure 23:
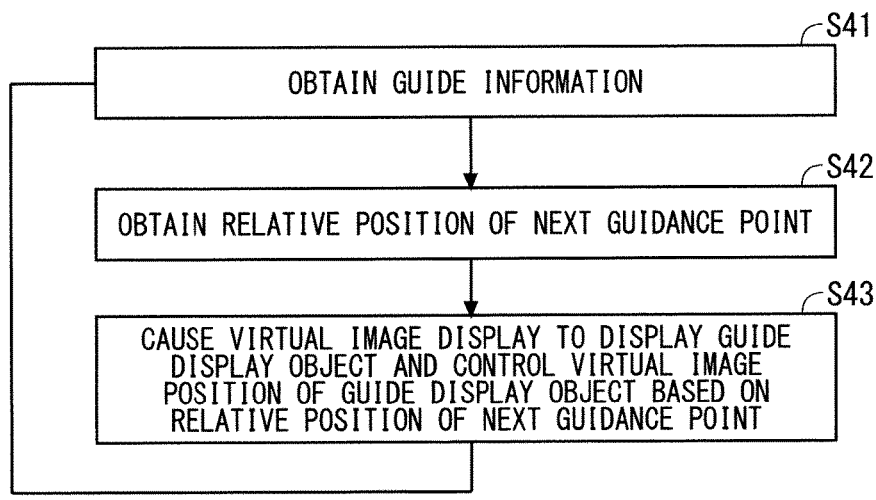
FIG. 23 A flow chart illustrating an operation of the display control device according to the embodiment 3.

FIG. 23 is a flow chart illustrating the operation of the display control device 1 according to the embodiment 3. Firstly, the guide information acquisition part 14 obtains the information of the route guidance (the guide information) of the own vehicle from the navigation device 4 (Step S41). Herein, the guide information acquisition part 14 obtains the information, which is necessary to draw the map to be the guide display object 32, such as a current position of the own vehicle, a map information around the own vehicle, and information of scheduled traveling route of the own vehicle, for example, from the navigation device 4. Next, the relative position acquisition part 11 obtains the relative position of a next guidance point and the own vehicle from the navigation device 4 (Step S42).

When the relative position acquisition part 11 obtains the relative position of the next guidance point, the controller 13 obtains various display objects constituting the map around the own vehicle from the display object storage 12, and causes the virtual image display 2 to display the map which is constructed using them as the guide display object 32 (Step S43). In Step S43, the controller 13 controls the virtual image position (the virtual image direction and the virtual image distance) of the guide display object 32 based on the relative position of the next guidance point and the own vehicle. The display control device 1 performs the operation of these Steps S41 to S43 repeatedly.

The virtual image position control of the guide display object 32 performed in Step S43 is described hereinafter. The controller 13 sets the virtual image direction of the guide display object 32 so that the map as the guide display object 32 is displayed in a certain position when seen from the driver (herein, an upper right part of the windshield 201 as illustrated in FIG. 22).

The controller 13 changes the virtual image distance of the guide display object 32 based on the relative position of the own vehicle and the next guidance point. Specifically, when the own vehicle enters a predetermined area on a basis of the guidance point, the virtual image distance of the guide display object 32 is made smaller than that before the own vehicle enters the area. In the present embodiment, the virtual image display 2 is assumed to be able to set the virtual image distance of the display object, selecting from 10 m and 50 m. "The predetermined area" described above indicates an area located within 70 m from the guidance point.

Figure 24:
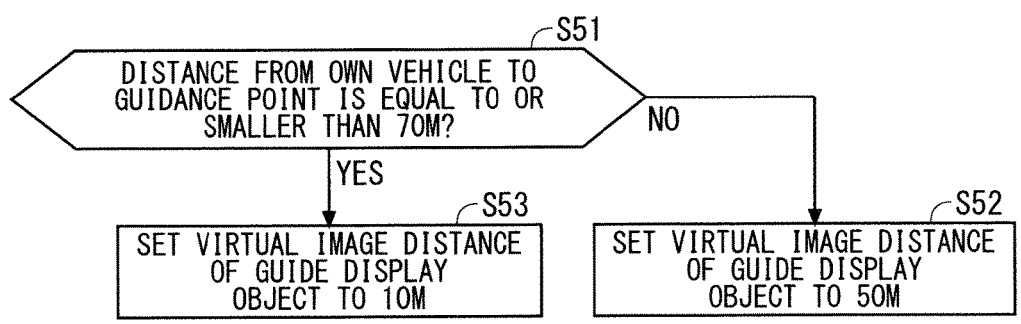
FIG. 24 A flow chart of a virtual image distance control in the embodiment 3.

FIG. 24 is a flow chart of the virtual image distance control of the guide display object in the display control device 1. Firstly, the controller 13 confirms whether the distance from the own vehicle to the guidance point is equal to or smaller than 70 m based on the relative position of the own vehicle and the guidance point obtained by the relative position acquisition part 11 (Step S51). At this time, when the distance from the own vehicle to the guidance point is larger than 70 m (NO in Step S51), the controller 13 sets the virtual image distance of the guide display object to 50 m (Step S52). When the distance from the own vehicle to the guidance point is equal to or smaller than 70 m (YES in Step S51), the controller 13 sets the virtual image distance of the guide display object to 10 m (Step S53).

Figure 25:
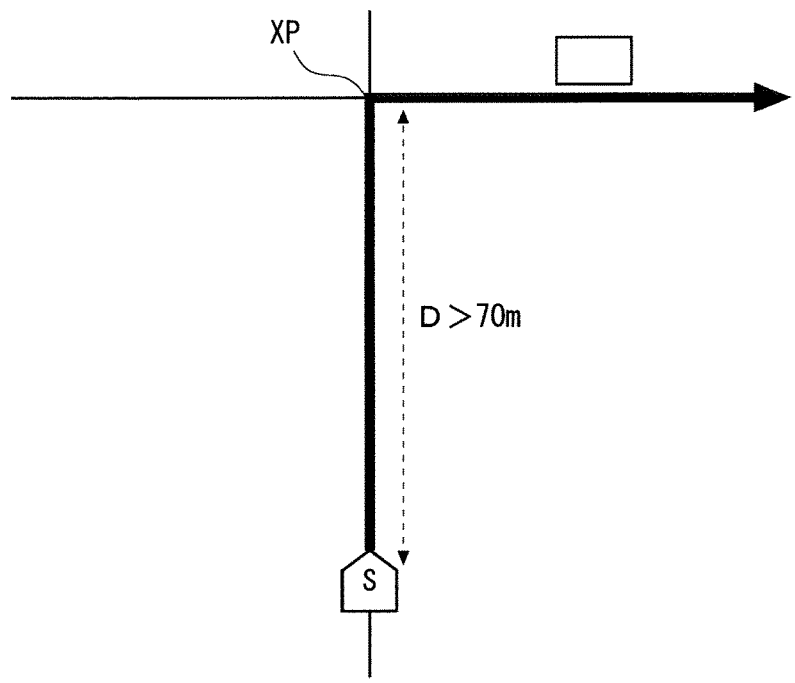
FIG. 25 A drawing illustrating an example of a positional relationship between the own vehicle and a guidance point.
Figure 26:
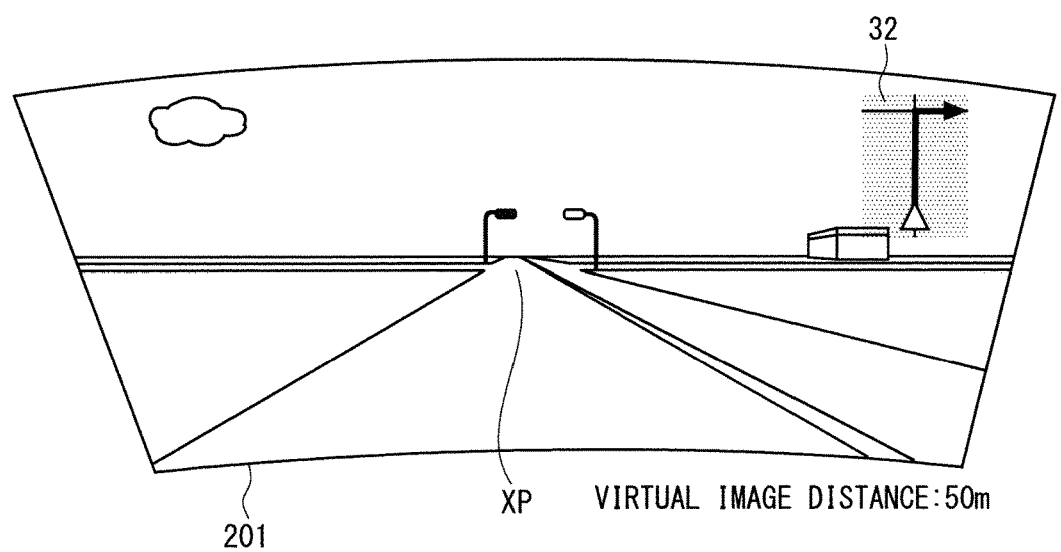
FIG. 26 A drawing illustrating a display example of the guide display object.

For example, an intersection XP located in front of the own vehicle S illustrated in FIG. 25 is determined to be the guidance point (in FIG. 25, a thick line indicates a scheduled traveling route of the own vehicle S, and the intersection XP indicates the guidance point where the navigation device 4 instructs the driver to turn right). When the distance D from the own vehicle S to the intersection XP is larger than 70 m as illustrated in FIG. 25, the map around the own vehicle which is the guide display object 32 is displayed in the virtual image distance 50 m as illustrated in FIG. 26.

Figure 27:
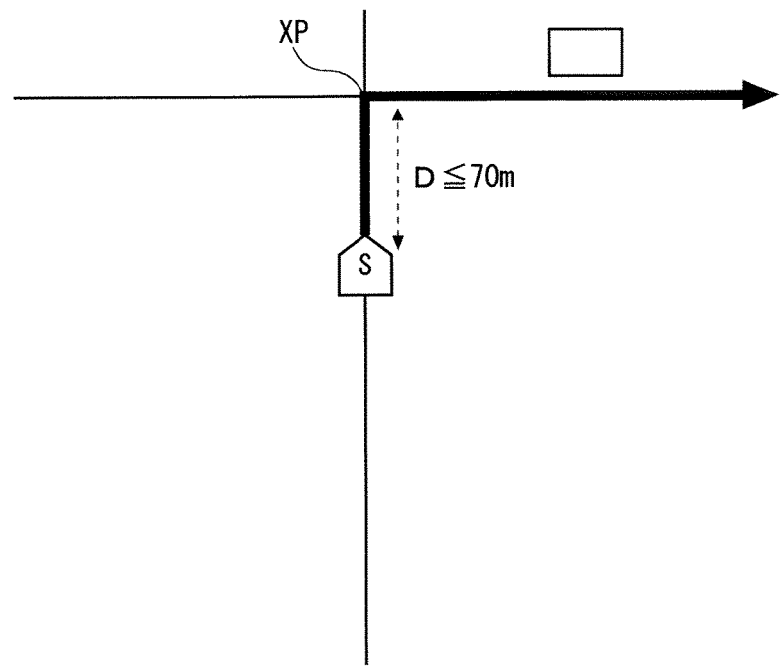
FIG. 27 A drawing illustrating an example of a positional relationship between the own vehicle and the guidance point.
Figure 28:
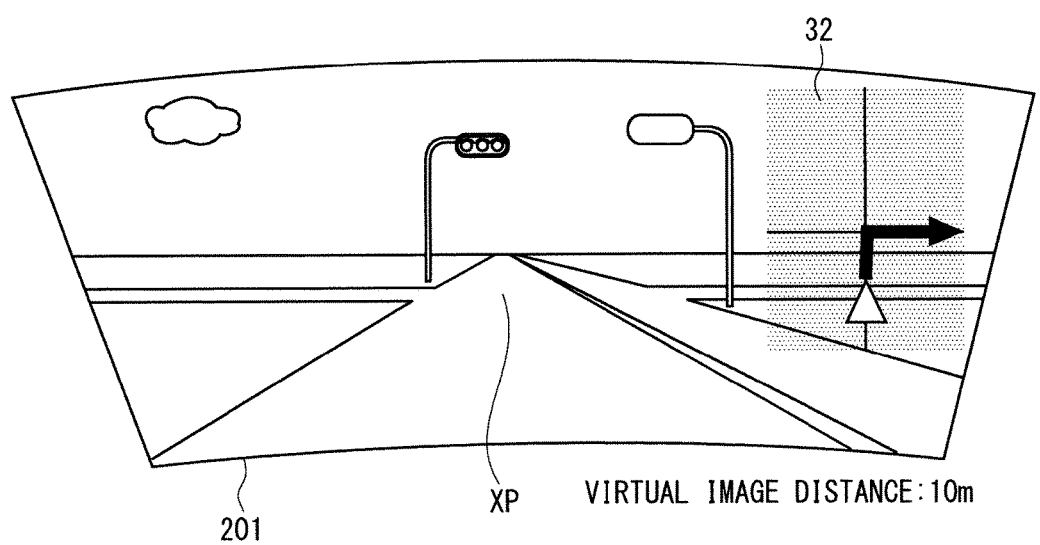
FIG. 28 A drawing illustrating a display example of the guide display object.

Subsequently, when the own vehicle S moves forward and the distance D from the own vehicle S to the intersection XP is reduced to be equal to or smaller than 70 m as illustrated in FIG. 27, the virtual image distance of the guide display object 32 is changed to 10 m as illustrated in FIG. 28. Accordingly, the driver of the own vehicle S can easily recognize that he/she has gotten closer to the guidance point (the intersection XP). The driver can also easily recognize that he/she needs to turn right at the guidance point upon viewing the map of the guide display object 32.

Figure 29:
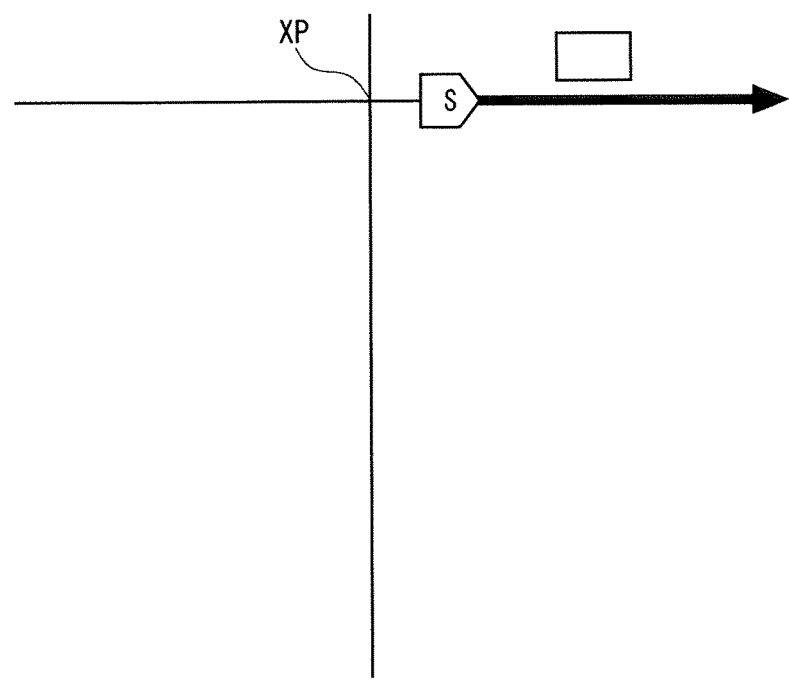
FIG. 29 A drawing illustrating an example of a positional relationship between the own vehicle and the guidance point.
Figure 30:
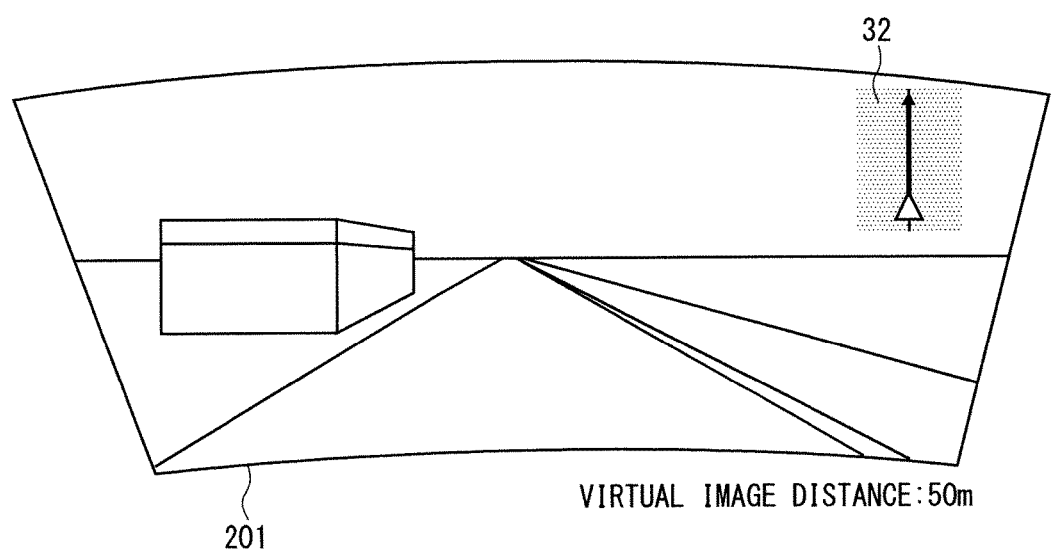
FIG. 30 A drawing illustrating a display example of the guide display object.

After the own vehicle S turns right at the intersection XP as illustrated in FIG. 29 (when the distance to the next guidance point is larger than 70 m), the virtual image distance of the guide display object 32 returns to 50 m as illustrated in FIG. 30.

Although the virtual image display 2 can set the virtual image distance to the two steps of 10 m and 50 m herein, it is also applicable that the virtual image display 2 can change the virtual image distance in multi-steps of three or more steps or in a continuous manner. In the above case, the virtual image distance of the guide display object 32 may be reduced in a step-by-step manner or a continuous manner as the own vehicle S gets closer to the intersection XP even after the distance D from the own vehicle S to the intersection XP is reduced to be equal to or smaller than 70 m (even after the virtual image distance is reduced to 10 m).

Figure 31:
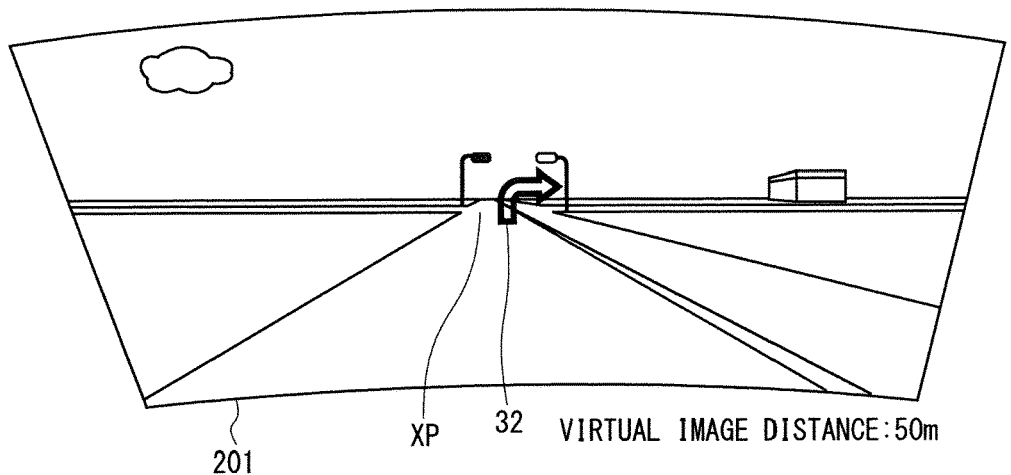
FIG. 31 A drawing illustrating a display example of the guide display object.
Figure 32:
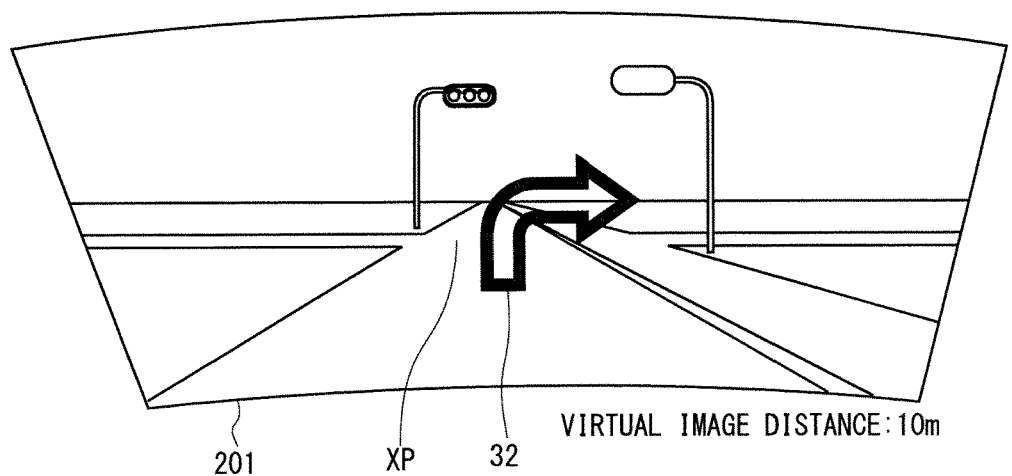
FIG. 32 A drawing illustrating a display example of the guide display object.

Although the guide display object 32 indicates the map around the own vehicle in the above description, for example, a graphic such as an arrow expressing a direction in which the own vehicle should move may also be indicated as the guide display object 32 as illustrated in FIG. 31 and FIG. 32. That is to say, it is also applicable that when the distance D from the own vehicle S to the intersection XP is larger than 70 m as illustrated in FIG. 25, the graphic of the arrow which is the guide display object 32 is displayed in the virtual image distance 50 m, and when the distance D from the own vehicle S to the intersection XP is reduced to be equal to or smaller than 70 m as illustrated in FIG. 27, the virtual image distance of the guide display object 32 is changed to 10 m as illustrated in FIG. 32. Since the graphic of the arrow has a smaller display area than the map, thereby hardly getting in the way of the visual field, its virtual image position (direction) may be located in a position where the driver sees the intersection or in its neighborhood as illustrated in FIG. 31 and FIG. 32.

A combination of the map around the own vehicle and the graphic of the arrow described above, for example, may also be the guide display object 32. For example, an image including both the map around the own vehicle and the graphic of the arrow may also be the guide display object 32. It is also applicable that only the map around the own vehicle is normally displayed as the guide display object 32 and when the own vehicle gets closer to the guidance point (for example, when the distance to the guidance point is reduced to equal to or smaller than 70 m), both the map around the own vehicle and the graphic of the arrow are displayed as the guide display object 32. Alternatively, it is also applicable that the map around the own vehicle is normally displayed as the guide display object 32 and when the own vehicle gets closer to the guidance point, the graphic of the arrow are displayed as the guide display object 32.

Embodiment 4

In case where the guide display object is the graphic of the arrow expressing the traveling direction as the example of FIG. 31 and FIG. 32, concerned is that it is difficult to recognize which intersection seen from the own vehicle the driver needs to turn when the intersections are sequentially located at short intervals. The embodiment 4 describes a technique to solve the above problem.

Figure 33:
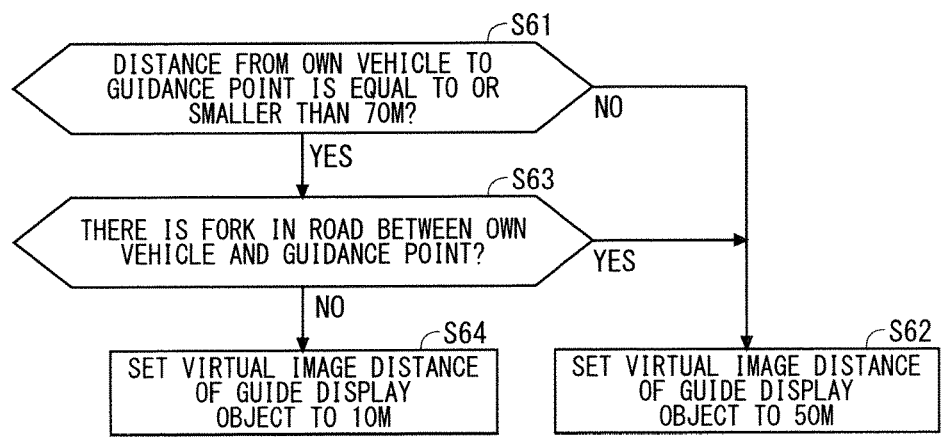
FIG. 33 A flow chart of a virtual image distance control in an embodiment 4.

FIG. 33 is a flow chart of a virtual image distance control in the embodiment 4. Firstly, the controller 13 confirms whether the distance from the own vehicle to the guidance point is equal to or smaller than 70 m based on the relative position of the own vehicle and the next guidance point obtained by the relative position acquisition part 11 (Step S61). At this time, when the distance from the own vehicle to the guidance point is larger than 70 m (NO in Step S61), the controller 13 sets the virtual image distance of the guide display object to 50 m (Step S62).

When the distance from the own vehicle to the guidance point is equal to or smaller than 70 m (YES in Step S61), the controller 13 further confirms whether or not there is a fork between the own vehicle and the guidance point (Step S63). When there is the fork between the own vehicle and the guidance point (YES in Step S63), the controller 13 sets the virtual image distance of the guide display object 32 to 50 m (Step S62). When there is no fork in the road between the own vehicle and the guidance point (NO in Step S63), the controller 13 sets the virtual image distance of the guide display object 32 to 10 m (Step S64).

As described above, in the embodiment 4, in case where there is the fork in the road between the own vehicle and the guidance point, the virtual image distance of the guide display object 32 is not reduced even when the own vehicle enters the area within 50 m of the guidance point (the virtual image distance is maintained 50 m).

Figure 34:
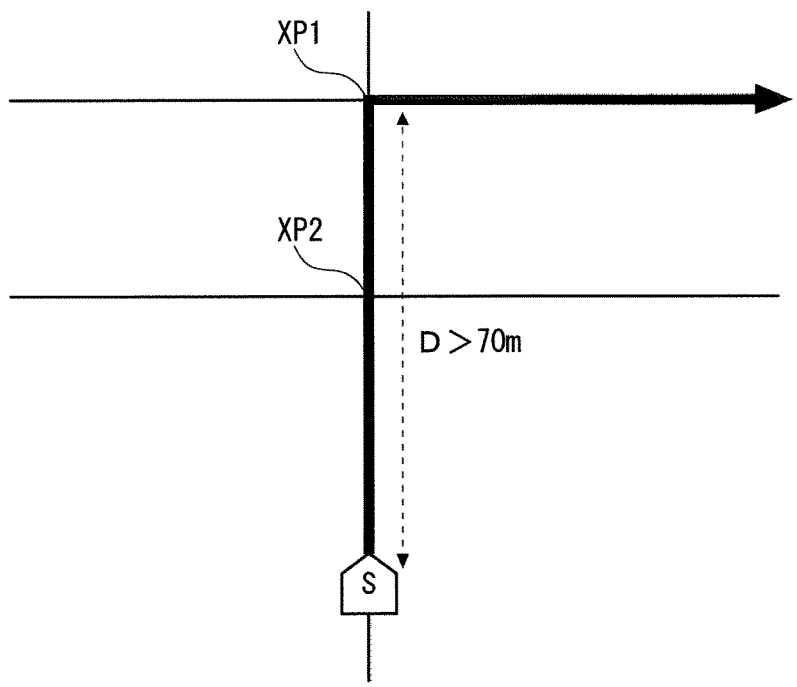
FIG. 34 A drawing illustrating an example of a positional relationship between the own vehicle and the guidance point.
Figure 35:
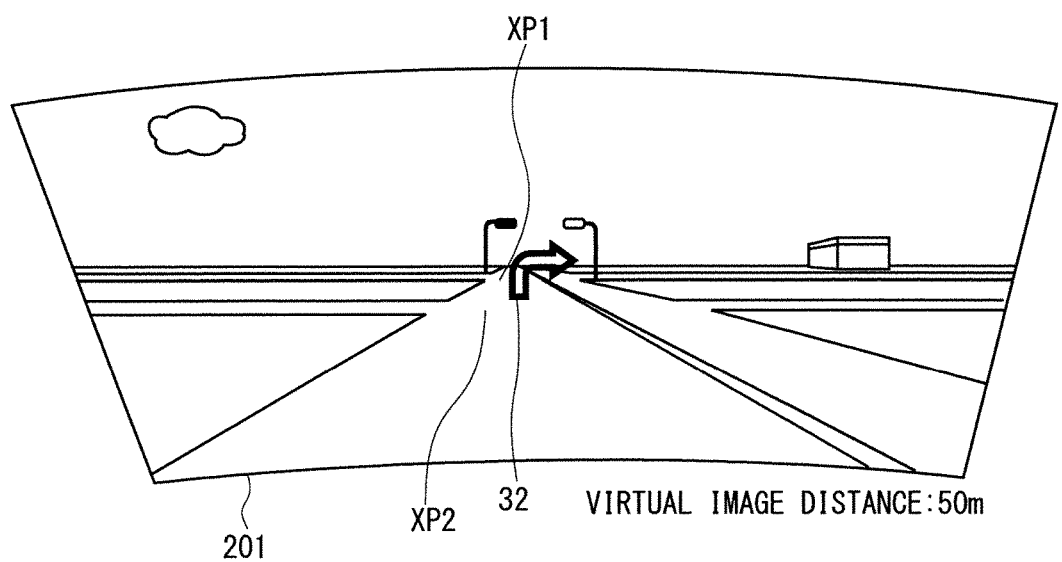
FIG. 35 A drawing illustrating a display example of the guide display object.

Considered, for example, is a case where an intersection XP1 located in front of the own vehicle S is the guidance point, and an intersection XP2 which is a fork is located on a near side of the intersection XP1 as illustrated in FIG. 34. When the distance D between the own vehicle S and the intersection XP1 is larger than 70 m as illustrated in FIG. 34, the guide display object 32 (the graphic of the arrow expressing the right turn herein) is displayed in the virtual image distance 50 m as illustrated in FIG. 35 in accordance with a principle.

Figure 36:
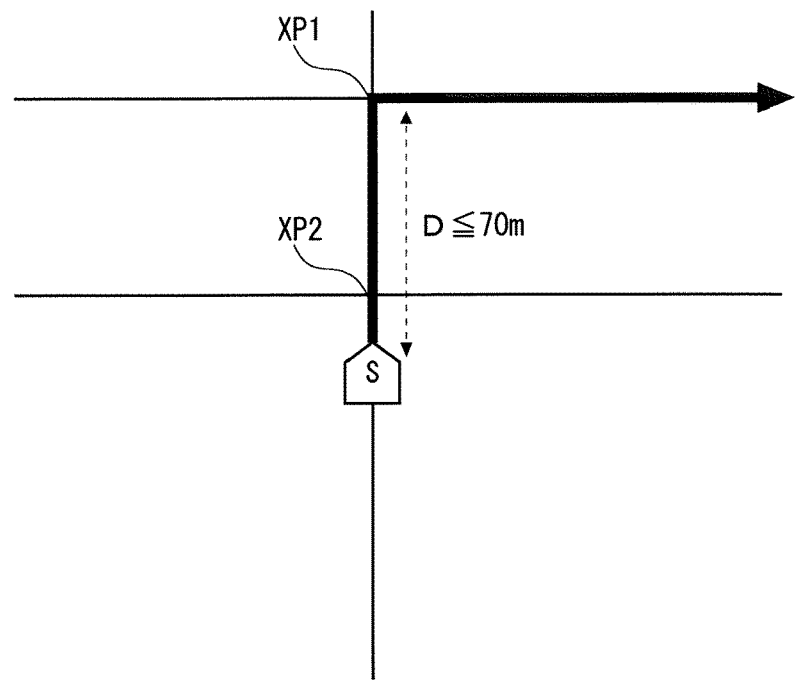
FIG. 36 A drawing illustrating an example of a positional relationship between the own vehicle and the guidance point.
Figure 37:
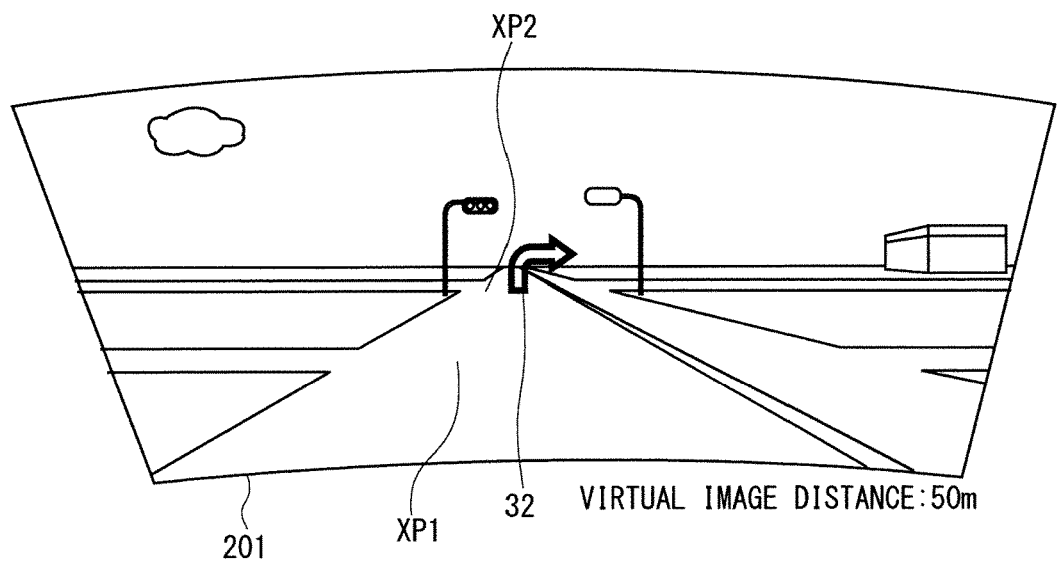
FIG. 37 A drawing illustrating a display example of the guide display object.

Subsequently, when the own vehicle S moves forward, the distance D from the own vehicle S to the intersection XP1 is reduced to be equal to or smaller than 70 m as illustrated in FIG. 36, however, when there is the intersection XP2 between the intersection XP1 and the own vehicle S, the virtual image distance of the guide display object 32 is exceptionally maintained 50 m as illustrated in FIG. 37.

When the own vehicle S further moves forward and passes the intersection XP2, the fork ceases to exist between the own vehicle S and the intersection XP1 as illustrated in FIG. 38. Then, as illustrated in FIG. 39, the virtual image distance of the guide display object 32 is changed to 10 m. Accordingly, the driver of the own vehicle S can easily recognize that the instruction to turn right provided by the guide display object 32 does not correspond to the intersection XP2 but corresponds to the intersection XP1.

Although the present embodiment describes the example that the image of the guide display object 32 is the graphic of the arrow, the image may also be another graphic, for example. The present embodiment may also be applied to a case where the image of the guide display object 32 is the map around the own vehicle as in the case of the embodiment 3.

Although the virtual image distance of the guide display object 32 is switched between two values of 50 m and 10 m in the present embodiment, a method of changing the virtual image distance of the guide display object 32 is not limited thereto. That is to say, another method is also applicable as long as the difference between the intersection which is the guidance point and another intersection (the intersection where the driver should not turn) can be respectively indicated by the variation of the virtual image distance. A variation may be added, in a step-by-step manner or a continuous manner, to a way of changing the virtual image distance of the guide display object 32.

Considered, for example, is a method of reducing the virtual image distance of the guide display object 32 in a step-by-step manner or a continuous manner during a period when the fork is located between the own vehicle and the guidance point after the own vehicle enters a predetermined area from the intersection, and subsequently reducing the virtual image distance of the guide display object 32 to a predetermined value when the fork ceases to exist between the own vehicle S and the guidance point. For example, it is also applicable that in the example of FIG. 34, the virtual image distance of the guide display object 32 is 50 m when the own vehicle S is 70 m or more away from the intersection XP1 (the guidance point); the virtual image distance is gradually reduced from 50 m to 40 m during a period after the own vehicle S enters the area 70 m away from the intersection XP1 until the own vehicle S moves to the intersection XP2; and the virtual image distance is changed to 10 m when the own vehicle passes the intersection XP2.

Moreover, also considered is a method, in case where there are a plurality of forks between the own vehicle and the guidance point when the own vehicle enters a predetermined area from the intersection, of gradually reducing the virtual image distance of the guide display object 32 every time the own vehicle passes each fork, and subsequently reducing the virtual image distance of the guide display object 32 to a predetermined value when the fork ceases to exist between the own vehicle and the guidance point. Assumed, for example, is a case where there are three forks between the own vehicle and the guidance point when the own vehicle enters the area 70 m away from the guidance point (a predetermined area). In the above case, it is also applicable that the virtual image distance of the guide display object 32 is 50 m when the own vehicle is 70 m or more away from the guidance point; the virtual image distance is reduced to 45 m when the own vehicle enters the area 70 m away from the guidance point; and subsequently, the virtual image distance is reduced to 40 m when the own vehicle passes the first fork; the virtual image distance is reduced to 35 m when the own vehicle passes the second fork; and the virtual image distance is changed to 10 m when the own vehicle passes the third fork and the fork thereby ceases to exist between the own vehicle and the guidance point.

Embodiment 5

When the guide display object is the map around the own vehicle as in the case of the embodiment 3, it is preferable that the virtual image distance of the map is reduced in a state where the own vehicle gets sufficiently close to the guidance point to the extent that a next guidance point is displayed in the map. It is because the driver cannot intuitively grasp the reason why the virtual image distance of the map is reduced unless the guidance point is not displayed in the map whose virtual image distance is reduced. The embodiment 5 describes an example that a timing of reducing the virtual image distance of the map as the guide display object is determined from this viewpoint.

Figure 40:
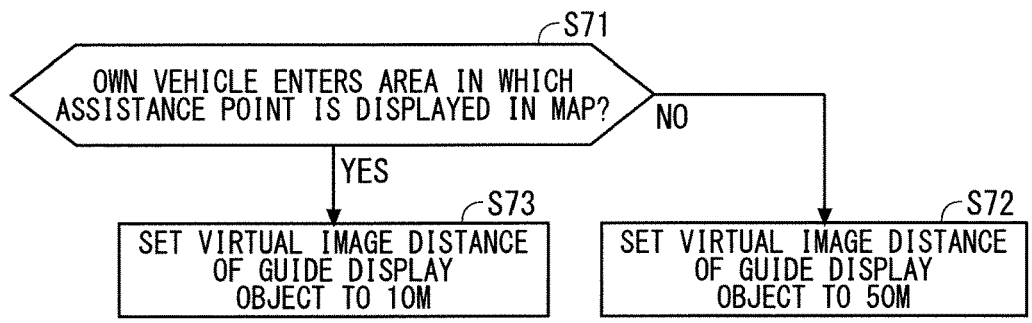
FIG. 40 A flow chart of a virtual image distance control in an embodiment 5.

FIG. 40 is a flow chart of a virtual image distance control of the guide display object in the embodiment 5. Herein, the guide display object is the image of the map around the own vehicle in the manner similar to the embodiment 3.

The controller 13 confirms whether the own vehicle enters the area in which a next guidance point is displayed in the map based on the relative position of the own vehicle and the next guidance point obtained by the relative position acquisition part 11 (Step S71). At this time, when the own vehicle does not enter the area in which the next guidance point is displayed in the map (NO in Step S71), the controller 13 sets the virtual image distance of the guide display object to 50 m (Step S72). When the own vehicle does enters the area in which the next guidance point is displayed in the map (YES in Step S71), the controller 13 sets the virtual image distance of the guide display object to 10 m (Step S73).

Figure 41:
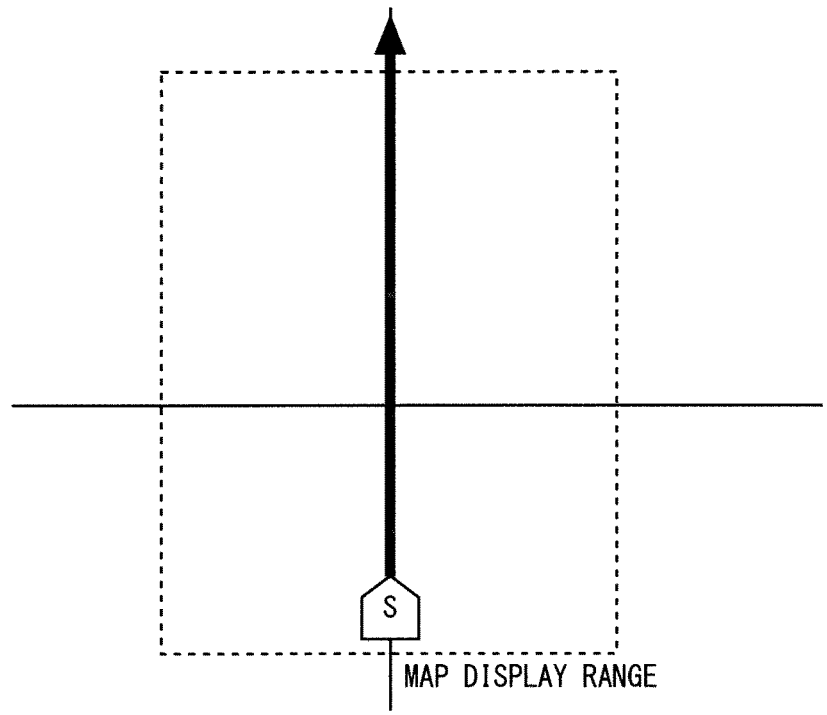
FIG. 41 A drawing illustrating an example of a region of a map (a map display range) displayed as the guide display object.
Figure 42:
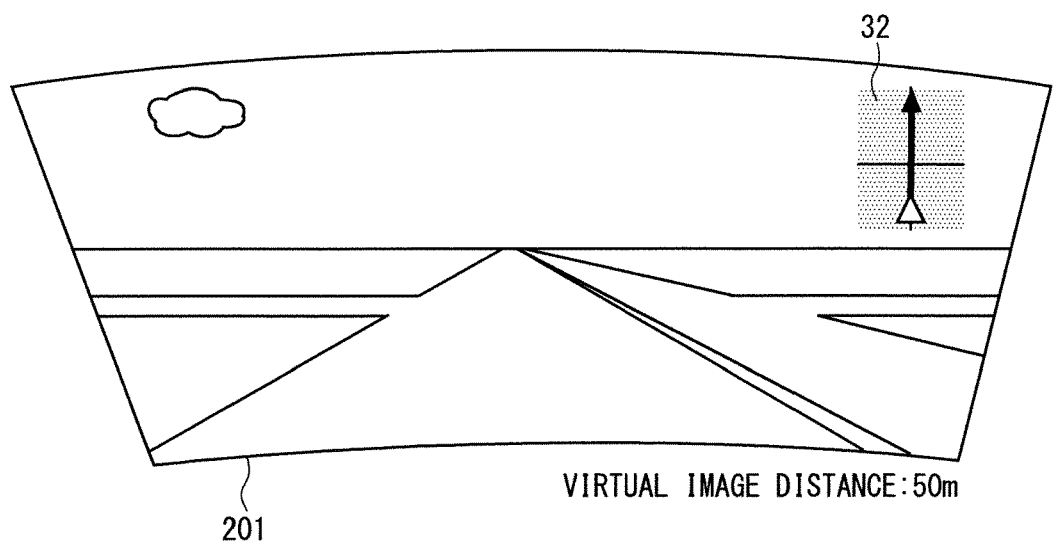
FIG. 42 A drawing illustrating a display example of the guide display object.

For example, considered is a case where a region displayed in the map as the guide display object 32 (a map display range) is a rectangular region including the position of the own vehicle S as indicated by a dotted line in FIG. 41. When there is no guidance point in the map display range as illustrated in FIG. 41 (an intersection located just in front of the own vehicle S is not a guidance point because the own vehicle S moves in straight line in FIG. 41), the map around the own vehicle which is the guide display object 32 is displayed in the virtual image distance 50 m as illustrated in FIG. 42.

Figure 43:
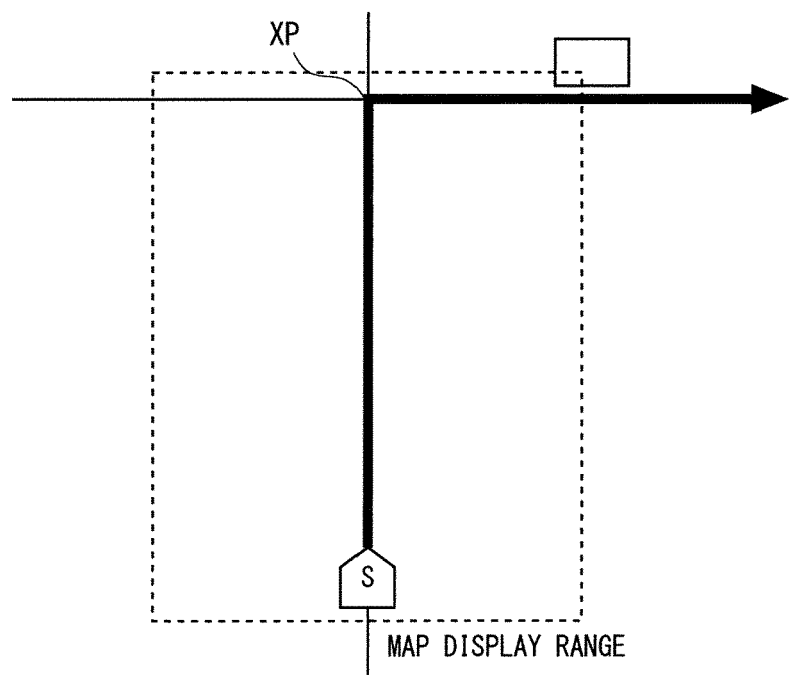
FIG. 43 A drawing illustrating an example of a positional relationship between the own vehicle and the guidance point.

Subsequently, when the guidance point appears in the map display range as illustrated in FIG. 43 while the own vehicle S moves, the virtual image distance of the map which is the guide display object 32 is changed to 10 m as illustrated in FIG. 44. Accordingly, the driver of the own vehicle S can easily recognize that he/she has gotten closer to the next guidance point (the intersection XP) and should turn right at the guidance point.

The technique of the embodiment 4 described above may also be applied to the present embodiment. That is to say, in case where there is the fork in the road between the own vehicle and the next guidance point, the virtual image distance of the guide display object 32 is not reduced even when the own vehicle enters the area in which the next guidance point is displayed in the map (the virtual image distance is maintained 50 m).

According to the present invention, the above embodiments can be arbitrarily combined, or each embodiment can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1 display control device, 2 virtual image display, 3 information-to-be-provided object detector, 4 navigation device, 11 relative position acquisition part, 12 display object storage, 13 controller, 14 guide information acquisition part, 31 position display object, 32 guide display object, 40 processing circuit, 41 processor, 42 memory, 200 driver, 201 windshield

The invention claimed is:

1. A display control device for controlling a virtual image display, wherein
said virtual image display can display a display object being a virtual image which can be visually recognized from a driver's seat of a vehicle through a windshield of said vehicle in a virtual image position defined by a virtual image direction which is a direction of said virtual image on a basis of a specific position of said vehicle and a virtual image distance which is a distance to said virtual image on a basis of said specific position, and
said display control device comprises:
a processor to execute a program; and
a memory to store said program which, when executed by said processor, performs processes of:
obtaining a relative position of an information-to-be-provided object which is a point or a feature associated with information with which a driver of said vehicle is provided, using said display object, and said vehicle; and
controlling a display of said virtual image display, and
said processor changes a virtual image distance of said display object in accordance with said relative position of said information-to-be-provided object corresponding to said display object and said vehicle, wherein,
when said vehicle enters a predetermined area on a basis of said information-to-be-provided object, said processor causes said virtual image distance of said display object to be smaller than said virtual image distance before said vehicle enters said predetermined area.

2. The display control device according to claim 1, wherein
in case where there is a point or a feature which belongs to a type identical with or similar to said information-to-be-provided object between said vehicle and said information-to-be-provided object, said processor maintains said virtual image distance of said display object in a state identical with a state before said vehicle enters said predetermined area even when said vehicle enters said predetermined area.

3. The display control device according to claim 1, wherein
said processor reduces said virtual image distance of said display object in a step-by-step manner or a continuous manner as said vehicle gets closer to said information-to-be-provided object after said vehicle enters said predetermined area.

4. The display control device according to claim 1, wherein
said information-to-be-provided object is a guidance point of which a navigation device of said vehicle performs a route guidance,
said display object corresponding to said information-to-be-provided object is a guide display object indicating contents of said route guidance, and
when said vehicle enters a predetermined area on a basis of said guidance point, said processor causes said virtual image distance of said guide display object to be smaller than said virtual image distance before said vehicle enters said predetermined area.

5. The display control device according to claim 4, wherein
said guide display object is an image of a map around said vehicle, and
said predetermined area is an area in which said map around said vehicle includes said guidance point.

6. The display control device according to claim 4, wherein
in case where there is a fork in a road between said vehicle and said guidance point, said processor maintains said virtual image distance of said guide display object in a state identical with a state before said vehicle enters said predetermined area even when said vehicle enters said predetermined area.

7. The display control device according to claim 4, wherein
said processor reduces said virtual image distance of said display object in a step-by-step manner or a continuous manner during a period when a fork in a road is located between said vehicle and said guidance point after said vehicle enters said predetermined area, and subsequently reduces said virtual image distance of said display object to a predetermined value when said fork in said road ceases to exist between said vehicle and said guidance point.

8. The display control device according to claim 4, wherein
in case where there are a plurality of forks in a road between said vehicle and said guidance point when said vehicle enters said predetermined area, said processor gradually reduces said virtual image distance of said display object every time said vehicle passes each of said forks, and subsequently reduces said virtual image distance of said display object to a predetermined value when each of said forks in said road ceases to exist between said vehicle and said guidance point.

9. The display control device according to claim 4, wherein
said processor reduces said virtual image distance of said guide display object in a step-by-step manner or a continuous manner as said vehicle gets closer to said guidance point after said vehicle enters said predetermined area.

10. The display control device according to claim 1, wherein
said information-to-be-provided object is a point or a feature located around a road along which said vehicle is moving.

11. The display control device according to claim 10, wherein
said display object corresponding to said point or said feature located around said road along which said vehicle is moving is a position display object indicating a position of said point or said feature.

12. A display device, comprising:
said display control device according to claim 1; and
said virtual image display.

13. A display control method of controlling a virtual image display, wherein
said virtual image display can display a display object being a virtual image which can be visually recognized from a driver's seat of a vehicle through a windshield of said vehicle in a virtual image position defined by a virtual image direction which is a direction of said virtual image on a basis of a specific position of said vehicle and a virtual image distance which is a distance to said virtual image on a basis of said specific position, and said display control method comprises:

obtaining a relative position of an information-to-be-provided object which is a point or a feature associated with information with which a driver of said vehicle is provided and said vehicle; and changing a virtual image distance of said display object in accordance with said relative position of said information-to-be-provided object corresponding to said display object and said vehicle, wherein, when said vehicle enters a predetermined area on a basis of said information-to-be-provided object, said display control method causes said virtual image distance of said display object to be smaller than said virtual image distance before said vehicle enters said predetermined area.

\* \* \* \* \*